(12) United States Patent
Lee et al.

(10) Patent No.: US 12,131,672 B2
(45) Date of Patent: Oct. 29, 2024

(54) DISPLAY DEVICE INCLUDING COVER WINDOW

(71) Applicant: SAMSUNG DISPLAY CO., LTD., Yongin-si (KR)

(72) Inventors: Kang-Woo Lee, Seoul (KR); Yougn Do Kim, Suwon-si (KR); Hyun Seok Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 160 days.

(21) Appl. No.: 18/057,202

(22) Filed: Nov. 18, 2022

(65) Prior Publication Data

US 2023/0078056 A1 Mar. 16, 2023

Related U.S. Application Data

(63) Continuation of application No. 17/229,578, filed on Apr. 13, 2021, now Pat. No. 11,508,268.

(51) Int. Cl.
*G09F 9/30* (2006.01)
*G06F 1/16* (2006.01)

(52) U.S. Cl.
CPC ............ *G09F 9/301* (2013.01); *G06F 1/1616* (2013.01)

(58) Field of Classification Search
CPC combination set(s) only.
See application file for complete search history.

(56) References Cited

U.S. PATENT DOCUMENTS

| | | | |
|---|---|---|---|
| 9,655,235 B2 | 5/2017 | Hwang et al. | |
| 9,658,650 B2 | 5/2017 | Cho | |
| 10,020,462 B1 | 7/2018 | Ai et al. | |
| 10,481,423 B2 | 11/2019 | Song et al. | |
| 10,541,373 B2* | 1/2020 | Park | G06F 1/1652 |
| 10,901,461 B2* | 1/2021 | Wu | G06F 1/1643 |
| 10,916,719 B2* | 2/2021 | Park | H10K 59/87 |
| 11,243,564 B2* | 2/2022 | Kim | G06F 1/1656 |
| 11,300,996 B2* | 4/2022 | Kim | G06F 1/1637 |
| 11,481,002 B2* | 10/2022 | Park | H04M 1/0216 |
| 11,508,268 B2* | 11/2022 | Lee | G09F 9/301 |
| 11,977,409 B2* | 5/2024 | Min | G06F 1/1641 |
| 2014/0029212 A1 | 1/2014 | Hwang et al. | |
| 2015/0043174 A1 | 2/2015 | Han et al. | |
| 2018/0046220 A1 | 2/2018 | Kim et al. | |
| 2018/0149904 A1 | 5/2018 | Song et al. | |
| 2018/0321708 A1* | 11/2018 | Wu | G06F 3/0443 |

(Continued)

FOREIGN PATENT DOCUMENTS

| | | |
|---|---|---|
| KR | 10-2017-0064633 A | 6/2017 |
| KR | 10-2018-0057814 A | 5/2018 |
| KR | 10-2018-0079093 A | 7/2018 |

*Primary Examiner* — Lisa Lea-Edmonds
(74) *Attorney, Agent, or Firm* — Lewis Roca Rothgerber Christie LLP

(57) ABSTRACT

A display device includes: a display panel; and a cover window on the display panel. The display panel and the cover window include a flat area, and a bendable area adjacent to the flat area. The cover window includes: patterns at the bendable area along a first direction; and dummy patterns at the flat area along the first direction, the dummy patterns including a first dummy pattern, and a second dummy pattern adjacent to the first dummy pattern. A length of the first dummy pattern is different from a length of the second dummy pattern.

20 Claims, 29 Drawing Sheets

(56) References Cited

U.S. PATENT DOCUMENTS

| | | | |
|---|---|---|---|
| 2020/0189239 A1 | 6/2020 | Chen et al. | |
| 2020/0319672 A1* | 10/2020 | Kim | G06F 1/1656 |
| 2021/0255666 A1* | 8/2021 | Kim | H04M 1/0268 |
| 2021/0286407 A1* | 9/2021 | Kim | H04M 1/0216 |
| 2022/0011815 A1* | 1/2022 | Min | G06F 1/1616 |
| 2022/0043485 A1* | 2/2022 | Park | H05K 5/04 |
| 2022/0093012 A1* | 3/2022 | Lee | G09F 9/301 |
| 2022/0183174 A1* | 6/2022 | Bae | B32B 3/266 |
| 2022/0238049 A1* | 7/2022 | Min | G09F 9/301 |
| 2022/0413556 A1* | 12/2022 | Lee | H04M 1/0216 |
| 2023/0018777 A1* | 1/2023 | Park | G06F 1/1652 |
| 2023/0078056 A1* | 3/2023 | Lee | G06F 1/1641 361/679.01 |

\* cited by examiner

DISPLAY DEVICE INCLUDING COVER WINDOW

CROSS-REFERENCE TO RELATED APPLICATIONS

This application is a continuation of U.S. patent application Ser. No. 17/229,578, filed Apr. 13, 2021, which claims priority to and the benefit of Korean Patent Application No. 10-2020-0122321, filed Sep. 22, 2020, the entire content of both of which is incorporated herein by reference.

BACKGROUND

1. Technical Field

Aspects of one or more embodiments of the present disclosure relate to a cover window, and a display device including the cover window.

2. Description of the Related Art

Electronic devices, for example, such as mobile phones, tablets, multimedia players, and/or televisions, include a display device for displaying images. The display device includes a display panel for realizing a screen for displaying the images. Flexible display devices including flexible display panels using flexible substrates as substrates of the display panels are currently being developed.

The flexible display device may include a cover window for protecting the flexible display panel from outside environments (e.g., from external impacts), and for transmitting the images displayed on the flexible display panel. A glass film with excellent surface quality and wear resistance may be used as the cover window. When the cover window is made to be slim, flexibility of the cover window may be increased, but impact resistance may be deteriorated. During a process for increasing the flexible characteristics of a predetermined area (e.g., an area that is bent when the flexible display device is folded) of the cover window, the optical characteristics of the corresponding area may be deteriorated, or may be observed (e.g., may be viewed or seen) to be different from other areas.

The above information disclosed in this Background section is for enhancement of understanding of the background of the present disclosure, and therefore, it may contain information that does not constitute prior art.

SUMMARY

One or more embodiments of the present disclosure are directed to a cover window for improving flexibility, impact resistance, and/or an optical characteristic, and a display device including the cover window.

According to one or more embodiments of the present disclosure, a display device includes: a display panel; and a cover window on the display panel. The display panel and the cover window include a flat area, and a bendable area adjacent to the flat area. The cover window includes: patterns at the bendable area along a first direction; and dummy patterns at the flat area along the first direction, the dummy patterns including a first dummy pattern, and a second dummy pattern adjacent to the first dummy pattern. A length of the first dummy pattern is different from a length of the second dummy pattern.

In an embodiment, the second dummy pattern may be located farther from the bendable area than the first dummy pattern; and the length of the second dummy pattern may be less than the length of the first dummy pattern.

In an embodiment, lengths of the dummy patterns may decrease as a distance between the dummy patterns and the bendable area increases.

In an embodiment, gaps between adjacent ones of the dummy patterns may increase as a distance between the dummy patterns and the bendable area increases.

In an embodiment, the cover window may include: a base film; grooves in the base film; and soft portions in the grooves, the soft portions having a lower rigidity than that of the base film; and the patterns and the dummy patterns may be formed by the grooves and the soft portions.

In an embodiment, depths of adjacent grooves from among the grooves at the flat area may be different from each other.

In an embodiment, depths of the grooves from among the grooves at the flat area may decrease as a distance from the bendable area increases.

In an embodiment, the patterns may include patterns in a first row, and patterns in a second row adjacent to the first row in a second direction crossing the first direction; and the patterns in the first row and the patterns in the second row may be alternately located along the first direction.

In an embodiment, the dummy patterns may include dummy patterns in a first row, and dummy patterns in a second row adjacent to the first row in the second direction; lengths of the dummy patterns in the first row may decrease as a distance of the dummy patterns in the first row from the bendable area increases; and lengths of the dummy patterns in the second row may decrease as a distance of the dummy patterns in the second row from the bendable area increases.

In an embodiment, depths of the grooves of the dummy patterns in the first row may decrease as a distance between the grooves of the dummy patterns in the first row and the bendable area increases; and depths of the grooves of the dummy patterns in the second row may decrease as a distance between the grooves of the dummy patterns in the second row and the bendable area increases.

In an embodiment, the cover window may be configured to be bent with a curvature radius R; and the dummy patterns may be located within a range of about $0.1\pi R$ to about $0.3\pi R$ from a border between the bendable area and the flat area, where $\pi$ is Pi.

According to one or more embodiments of the present disclosure, a display device includes: a display panel; and a cover window on the display panel. The display panel and the cover window include a flat area, and a bendable area adjacent to the flat area. The cover window includes: a base film having grooves along a first direction, the grooves including a first groove, and a second groove adjacent to the first groove at the flat area; and soft portions in the grooves, the soft portions having a lower rigidity than that of the base film. A depth of the first groove is different from a depth of the second groove.

In an embodiment, the second groove may be located farther from the bendable area than the first groove; and the depth of the second groove may be less than the depth of the first groove.

In an embodiment, depths of the grooves at the flat area may decrease as a distance of the grooves at the flat area from the bendable area increases.

In an embodiment, gaps between adjacent ones of the grooves at the flat area may increase as a distance of the grooves at the flat area from the bendable area increases.

In an embodiment, the cover window may include: patterns at the bendable area along the first direction; and dummy patterns at the flat area along the first direction; and the dummy patterns may have the same length as each other.

In an embodiment, the cover window may include: patterns at the bendable area along the first direction; and dummy patterns at the flat area along the first direction; and lengths of the dummy patterns may decrease as a distance of the dummy patterns from the bendable area increases.

In an embodiment, the cover window may include: patterns in a first row at the bendable area; patterns in a second row at the bendable area, the second row being adjacent to the first row in a second direction crossing the first direction; dummy patterns in a first row at the flat area; and dummy patterns in a second row at the flat area, the second row being adjacent to the first row in the second direction. Depths of the grooves of dummy patterns in the first row may decrease as a distance of the grooves of the dummy patterns in the first row from the bendable area increases; and depths of the grooves of dummy patterns in the second row may decrease as a distance of the grooves of the dummy patterns in the second row from the bendable area increases.

In an embodiment, lengths of the dummy patterns in the first row may decrease as a distance of the dummy patterns in the first row from the bendable area increases; and lengths of the dummy patterns in the second row may decrease as a distance of the dummy patterns in the second row from the bendable area increases.

According to one or more example embodiments of the present disclosure, a display device includes: a display panel; and a cover window on the display panel. The cover window includes: a flat area; a bendable area adjacent to the flat area; a base film having grooves along a first direction; soft portions in the grooves at the bendable area; and hard portions in the grooves at the flat area, the hard portions having a greater rigidity than that of the soft portions.

In an embodiment, the soft portions may have a pencil hardness of 4B or less, and the hard portions may have a pencil hardness of 7H or more.

In an embodiment, the grooves and the soft portions may form patterns at the bendable area; the grooves and the hard portions may form dummy patterns at the flat area; and the dummy patterns may be located over an entirety of the flat area.

According to one or more embodiments of the present disclosure, a cover window may be provided for improving the flexible characteristic, the impact resistance, and/or the optical characteristic, and a display device including the cover window may be provided. However, the present disclosure is not limited to the above aspects and features, and other aspects and features may be realized from the detailed description with reference to the figures.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Figure 1A:
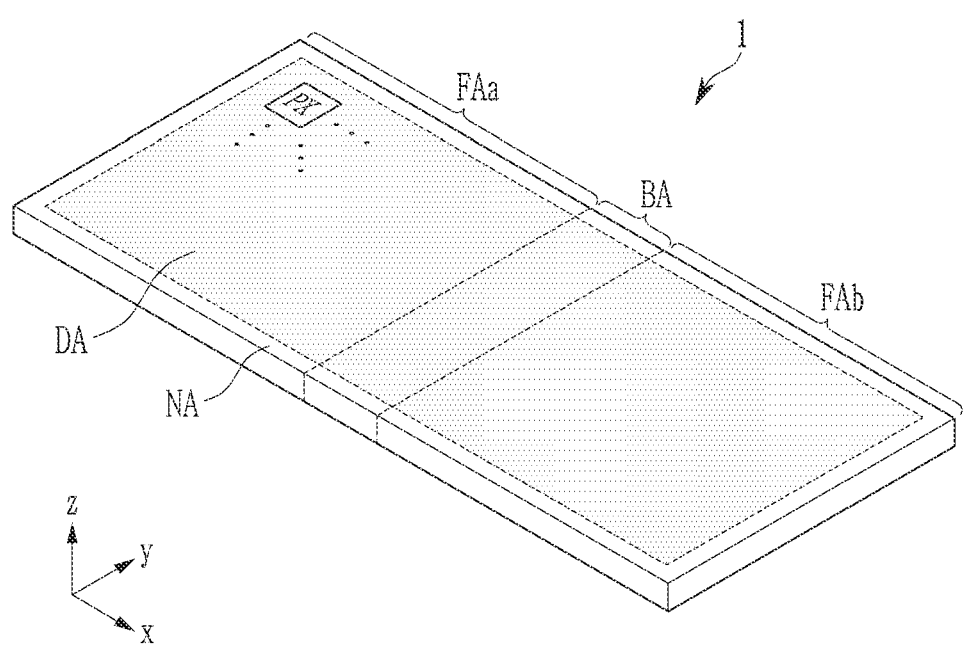
FIG. 1A shows a perspective view of a flexible display device according to an embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the drawings, directions indicated with the symbols "x", "y", and "z" are used to indicate different directions from each other, for example, such that "x" represents a first direction, "y" represents a second direction that is perpendicular to or substantially perpendicular to the first direction, and "z" represents a third direction that is perpendicular to or substantially perpendicular to the first direction and the second direction. In this case, the first direction x, the second direction y, and the third direction z may correspond to a horizontal direction, a vertical direction, and a thickness direction of the display device.

Unless specifically described in the specification, the terms "overlap with" and "overlapping with" signify elements that overlap with each other in the third direction z, and signify overlapping with each other in a plan view, or in other words, in a view from a direction that is perpendicular to or substantially perpendicular to a top surface of the relevant element or layer.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
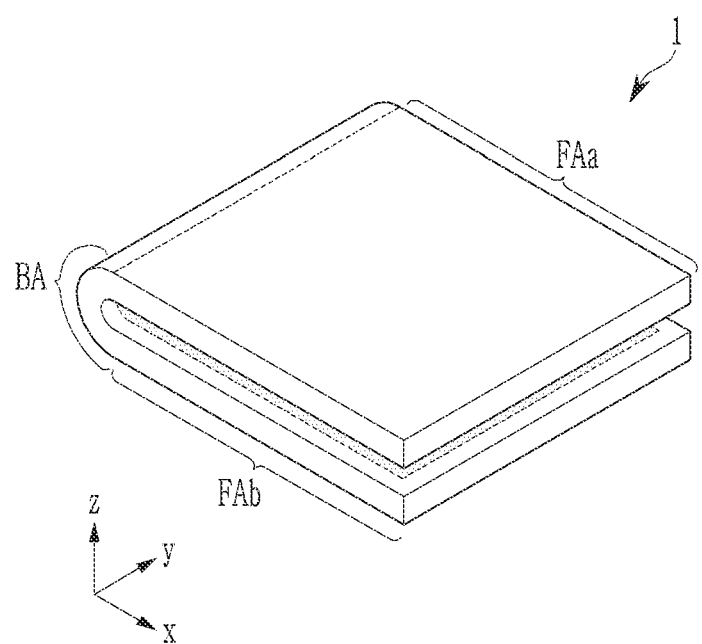
FIG. 1B shows a perspective view of a flexible display device according to an embodiment.
Figure 1C:
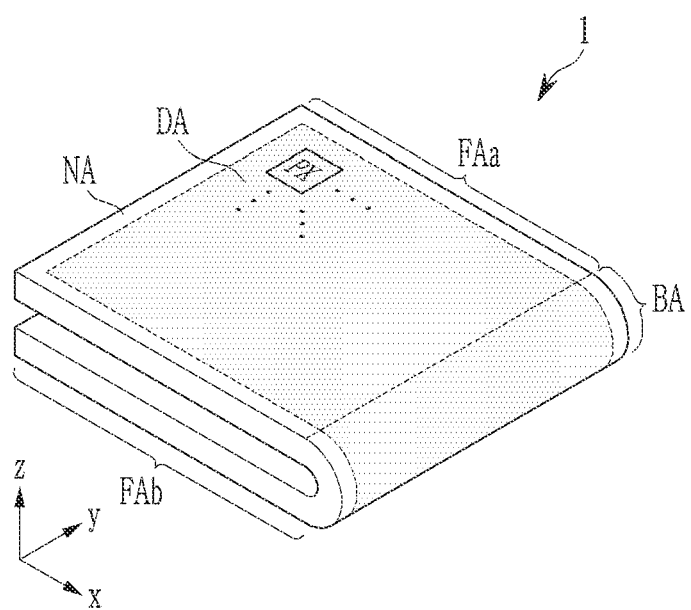
FIG. 1C shows a perspective view of a flexible display device according to an embodiment.

FIG. 1A, FIG. 1B, and FIG. 1C show perspective views of a flexible display device according to one or more embodiments. FIG. 1A, FIG. 1B, and FIG. 1C show an unfolded state, a first folded state, and a second folded state, respectively, of a flexible display device.

The flexible display device 1 (hereinafter, "the display device") may be unfolded to be flat or substantially flat as shown in FIG. 1A, and/or may be a foldable display device as shown in FIG. 1B and/or FIG. 1C. The display device 1 may include a bendable area BA, and a first flat area FAa and a second flat area FAb at (e.g., in or on) respective sides (e.g., opposite sides) of the bendable area BA. The bendable area BA is bent when the display device 1 is folded, and the first flat area FAa and the second flat area FAb are not bent.

One bendable area BA is illustrated in FIGS. 1A to 1C, but the present disclosure is not limited thereto, and the display device 1 may include a plurality of bendable areas BA that may be spaced apart (e.g., may be separated) from each other, or may be bent with different curvature radii from each other. For example, the display device 1 may include at least two bendable areas, and at least three flat areas.

The display device 1 may include a display area DA for displaying an image, and a non-display area NA surrounding (e.g., around a periphery of) the display area DA. The display area DA may correspond to a screen at (e.g., in or on) which pixels PX are arranged. The non-display area NA may correspond to a bezel. The bendable area BA may be positioned to traverse the display area DA. The display device 1 may include a display panel for realizing the screen, and may include a cover window for covering the display panel.

As shown in FIG. 1B, the display device 1 may be folded (hereinafter, referred to as in-folded) so that portions of the screen may face each other, or in other words, so that the screen portion of the first flat area FAa may face the screen portion of the second flat area FAb. As shown in FIG. 1C, the display device 1 may be folded (hereinafter, referred to as out-folded) so that the screen may be exposed to the outside.

In the in-folded state, the screen portion of the bendable area BA may be covered as shown in FIG. 1B. In the out-folded state, the screen portion of the bendable area BA may be exposed as shown in FIG. 1C, so that a user may view an image displayed on the screen portion. The display device 1 may be designed to be in-folded, out-folded, or both. When the display device 1 includes a plurality of bendable areas BA, one of the bendable areas BA may be a bendable area that may be in-folded, and another of the bendable areas BA may be a bendable area that may be out-folded.

The display device 1 may further include a housing, and various suitable parts for configuring the display device 1, for example, such as the display panel, a driving device, a printed circuit board (PCB), an application processor, memory, a speaker, and various suitable sensors, may be positioned in a space formed by the cover window and the housing.

The cover window according to various embodiments of the present disclosure will now be described in more detail. From among the various embodiments, an embodiment of FIG. 2 will be described in more detail hereinafter, and the other embodiments may be described with emphasis on the differences from the embodiment of FIG. 2, such that redundant description therebetween may not be repeated.

Figure 2A:
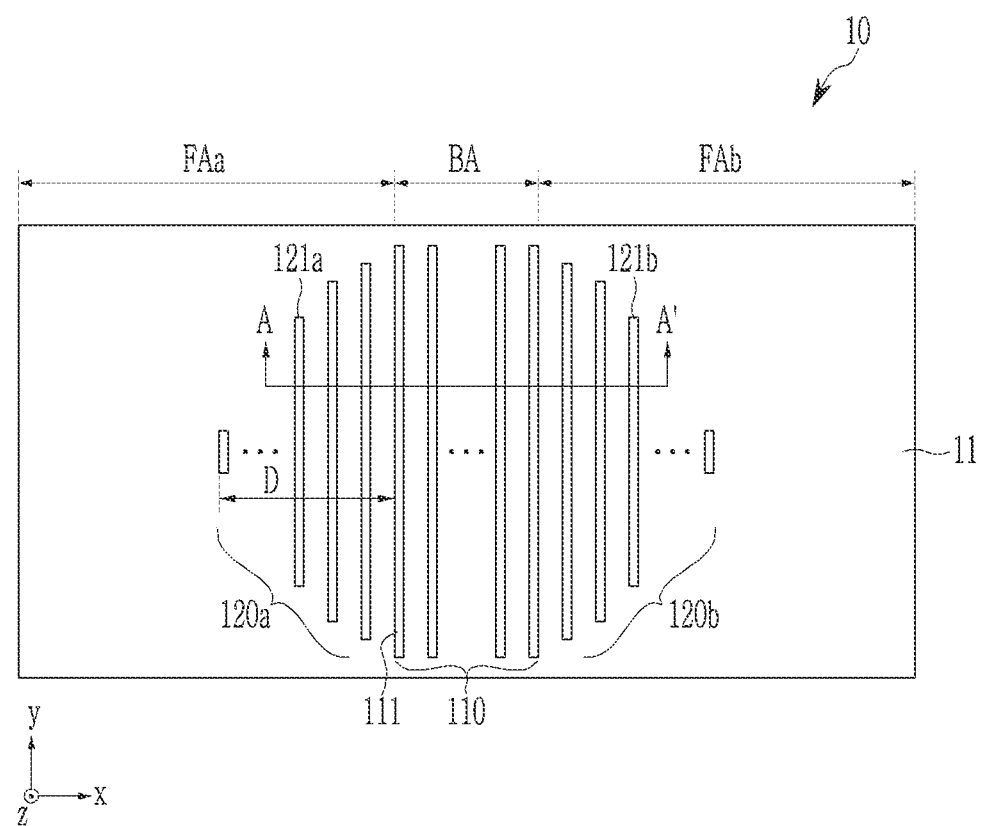
FIG. 2A shows a top plan view of a cover window according to an embodiment.
Figure 2B:
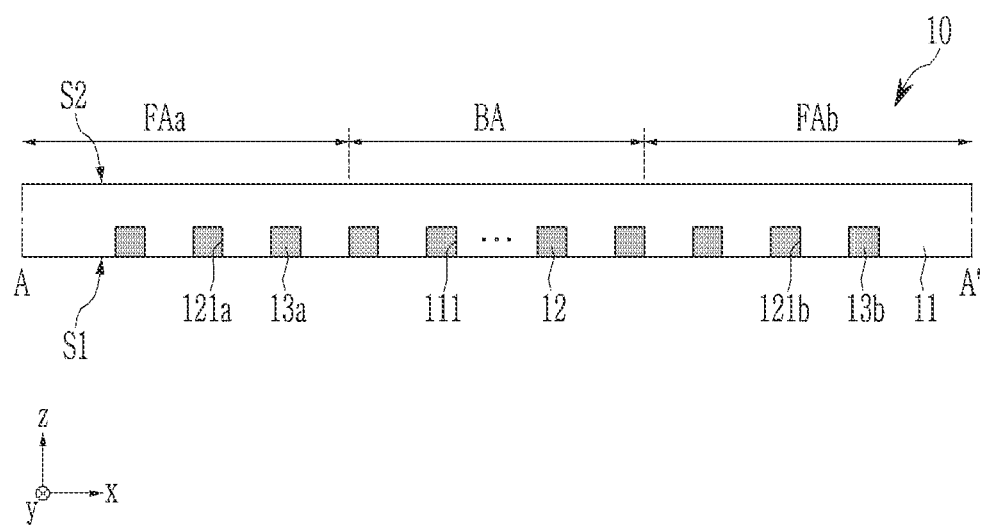
FIG. 2B shows a cross-sectional view taken along the line A-A' of FIG. 2A according to an embodiment.
Figure 2C:
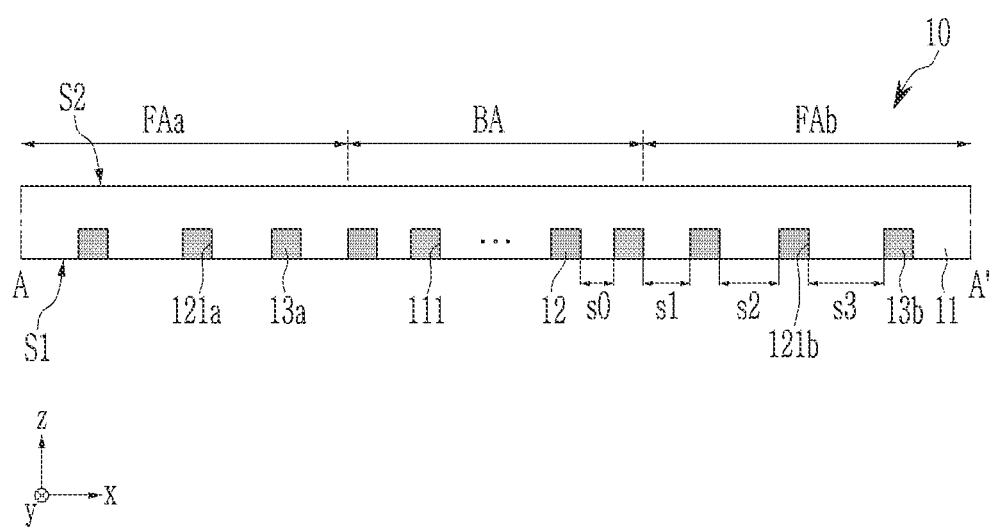
FIG. 2C shows a cross-sectional view taken along the line A-A' of FIG. 2A according to an embodiment.
Figure 2D:
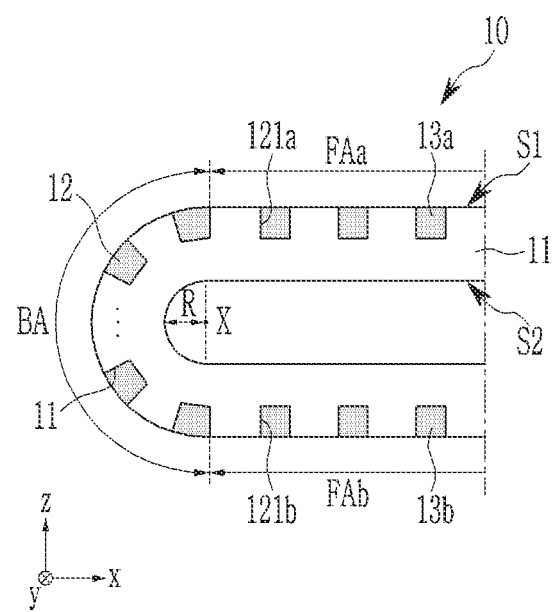
FIG. 2D shows a folded cover window of FIG. 2B.

FIG. 2A shows a top plan view of a cover window according to an embodiment. FIG. 2B and FIG. 2C show cross-sectional views taken along the line A-A' of FIG. 2A according to one or more embodiments. FIG. 2D shows a folded cover window of FIG. 2B.

Referring to FIG. 2A, FIG. 2B, FIG. 2C, and FIG. 2D, the cover window 10 may include the first flat area FAa, the second flat area FAb, and the bendable area BA between the first flat area FAa and the second flat area FAb. The first flat area FAa, the second flat area FAb, and the bendable area BA of the cover window 10 may correspond to the first flat area FAa, the second flat area FAb, and the bendable area BA, respectively, of the display device 1. The bendable area BA may be bent with respect to a bending axis X that is parallel to or substantially parallel to the second direction y, such that the cover window 10 may be folded so that the first flat area FAa my face the second flat area FAb.

The cover window 10 may have a plate shape. A first surface S1 and a second surface S2 that are opposite sides of the cover window 10 may be flat or substantially flat. The cover window 10 may generally have a uniform thickness (e.g., may have a uniform or substantially uniform thickness). The thickness of the cover window 10 may be in a range of 10 μm to 500 μm, considering desired impact resistance and flexibility characteristics thereof. For example, in an embodiment, the cover window 10 may have a thickness of 150 μm to 300 μm. The thickness of the bendable area BA of the cover window 10 may be less than the thicknesses of the first and second flat areas FAa and FAb.

The cover window 10 may include patterns 110 at (e.g., in or on) the bendable area BA. The cover window 10 may further include first dummy patterns 120a at (e.g., in or on) the first flat area FAa, and second dummy patterns 120b at (e.g., in or on) the second flat area FAb. The patterns 110, the first dummy patterns 120a, and the second dummy patterns 120b may be arranged along the first direction x. The first dummy patterns 120a and the second dummy patterns 120b may be symmetric or substantially symmetric to each other with respect to the bendable area BA.

The cover window 10 includes a base film 11 including (e.g., made of) a hard material, for example, such as glass. The base film 11 may define a shape of the cover window 10.

Grooves 111 are positioned on the base film 11 at (e.g., in or on) the bendable area BA of the cover window 10. The cover window 10 includes soft portions 12 positioned in the grooves 111. A combination of the grooves 111 and the soft portions 12 form the patterns 110 at (e.g., in or on) the bendable area BA. Each of the grooves 111 may be formed to be concave toward the second surface S2 from the first surface S1 of the cover window 10. The grooves 111 may extend in the second direction y. The grooves 111 may have a width in the first direction x, a length in the second direction y, and a depth in the third direction z. A cross-sectional shape of the groove 111 may be a quadrangle shape or substantially a quadrangle shape as shown in the figures. However, the present disclosure is not limited thereto, and the grooves 111 may have various suitable cross-sectional shapes, for example, such as a semicircle shape, a semi-oval shape, a triangle shape, and/or the like, in addition to, or instead of, the quadrangle shape shown in the figures. The length and the width of a corresponding pattern 110 may be defined by the length and the width of a corresponding groove 111.

The grooves 111 may be positioned to be spaced apart (e.g., to be separated) from an edge of the cover window 10 or the base film 11. In other words, respective ends of the groove 111 may not contact (e.g., may not touch) the edge of the cover window 10 or the base film 11 in the second direction y. In this case, the bendable area BA may be improved, such that facilitation of the restoration to the flat state after being bent may be improved. However, the present disclosure is not limited thereto, and at least one of the grooves 111 may be positioned (e.g., may extend) up to the edge of the cover window 10 or the base film 11.

The soft portions 12 may be formed (e.g., may be made) by filling a soft material, for example, such as a silicon-based resin or an acryl-based resin, in the grooves 111. For example, the soft portions 12 may have a pencil hardness that is equal to or less than 4B. A surface of the soft portions 12 may define part of the first surface S1 of the cover window 10. The soft portions 12 may be positioned so that the refractive index thereof may correspond to (e.g., may match) that of the base film 11. For example, for a wavelength of 550 nm, the soft portions 12 may have the same or substantially the same refractive index as that of the base film 11.

When the cover window 10 is made of the base film 11, and the base film 11 has a thinner thickness for the flexible characteristics of the cover window 10, an impact resistance thereof may be deteriorated. However, according to one or more embodiments of the present disclosure, when the grooves 111 are provided on the base film 11 at (e.g., in or on) the bendable area BA of the cover window 10, and the soft portions 12 are provided in the grooves 111 as described with reference to the present embodiments, the flexible characteristics of the bendable area BA may be improved, while increasing the thickness of the base film 11 and the thickness of the cover window 10. An elastic modulus of the bendable area BA is reduced by the soft portions 12 having a lower rigidity than that of the base film 11, so that the flexible characteristics of the bendable area BA may be increased.

The refractive index of the soft portions 12 corresponds to (e.g., matches) that of the base film 11, so light passing through the patterns 110 of the cover window 10 may not be distorted, and the patterns 110 may be prevented or substantially prevented from being visible. However, the base film 11 and the soft portions 12 have different materials from each other, so it may be difficult to match the refractive indexes of the soft portions 12 and the base film 11 with each other over the entire wavelengths. For example, a refractive index difference between the base film 11 and the soft portions 12 may be 0.0003 for the wavelength of 550 nm, and may be equal to or greater than 0.004 in the short wavelengths. Thus, a color difference (e.g., a color difference of reflected light) between the bendable area BA at (e.g., in or on) which the patterns 110 are positioned and the flat areas FAa and FAb may be observed. To prevent or reduce (e.g., to alleviate) the visibility of the color difference, the cover window 10 may further include the first and second dummy patterns 120a and 120b at (e.g., in or on) the first and second flat areas FAa and FAb.

For the first and second dummy patterns 120a and 120b, grooves 121a and 121b are positioned in the base film 11 at (e.g., in or on) the first and second flat areas FAa and FAb. The cover window 10 includes soft portions 13a and 13b positioned in the grooves 121a and 121b. The grooves 121a and the soft portions 13a are combined to each other to form the first dummy patterns 120a at (e.g., in or on) the first flat area FAa. The grooves 121b and the soft portions 13b are combined to each other to form the second dummy patterns 120b at (e.g., in or on) the second flat area FAb.

Each of the grooves 121a and 121b may be formed to be concave toward the second surface S2 from the first surface S1 of the cover window 10. The grooves 121a and 121b may extend in the second direction y. The grooves 121a and 121b may have a width in the first direction x, a length in the second direction y, and a depth in the third direction z. The grooves 121a and 121b may have a cross-sectional shape of a quadrangle or substantially a quadrangle. However, the present disclosure is not limited thereto, and the grooves 121a and 121b may have various suitable cross-sectional shapes, for example, such as a semi-circle shape, a semi-oval shape, a triangle shape, and/or the like, in addition to, or instead of, the quadrangle shape.

The soft portions 13a and 13b may be formed by filling the grooves 121a and 121b with a soft material, for example, such as a silicon-based resin or an acryl-based resin. For example, the soft portions 13a and 13b may have a pencil hardness that is equal to or less than 4B. The surfaces of the soft portions 13a and 13b may define a part of the first surface S1 of the cover window 10. The soft portions 13a and 13b may be formed to correspond to (e.g., to match) the refractive index of that of the base film 11. The soft portions 13a and 13b may include (e.g., may be made of) the same material as that of the soft portions 12.

Unlike the patterns 110, the first and second dummy patterns 120a and 120b may be provided to improve a visibility of the cover window 10, rather than the flexible characteristics thereof. In other words, the first and second dummy patterns 120a and 120b may be provided to improve (e.g., to prevent or reduce) a visibility of the bendable area BA, such that the bendable area BA may not be differently observed from the first and second flat areas FAa and FAb. Accordingly, the lengths of the first dummy patterns 120a, the grooves 121a forming the first dummy patterns 120a, and the soft portions 13a positioned in the grooves 121a may be reduced (e.g., may be gradually reduced) as a distance from the bendable area BA is increased. Similar to the first dummy patterns 120a, the lengths of the second dummy patterns 120b, the grooves 121b forming the second dummy patterns 120b, and the soft portions 13b positioned in the grooves 121b may be reduced (e.g., may be gradually reduced) as a distance from the bendable area BA is increased.

As described above, when the lengths of the first and second dummy patterns 120a and 120b are reduced (e.g., are gradually reduced), a color of the cover window 10 may not be suddenly changed around (e.g., near or adjacent to) a border between the bendable area BA and the first and second flat areas FAa and FAb, and instead, may be gradually changed as a distance from the bendable area BA increases. Accordingly, when the patterns 110 are positioned at (e.g., in or on) the bendable area BA so as to improve the flexible characteristics of the bendable area BA, the user may fail to recognize a color difference between the bendable area BA and the first and second flat areas FAa and FAb, or it may be more difficult to recognize the color difference.

The first dummy patterns 120a may be positioned within a range of about $0.1\pi R$ to about $0.3\pi R$ (here, iris Pi, and R is a curvature radius of the bendable area BA when the cover window 10 is folded) from the border between the bendable area BA and the first flat area FAa, which may be a desirable range for minimizing or reducing the area in which an impact resistance is deteriorated at (e.g., in or on) the first flat area FAa while being more difficult to recognize the color difference. Similarly, the second dummy patterns 120b may be desirably positioned within the range of about $0.1\pi R$ to about $0.3\pi R$ from the border between the bendable area BA and the second flat area FAb.

As shown in FIG. 2D, the curvature radius R may be a curvature radius of the second surface S2 at (e.g., in or on) the bendable area BA when the second surface S2 of the cover window 10 is folded to be positioned inside. When the first surface S1 of the cover window 10 is folded to be positioned inside, the curvature radius R may be a curvature radius of the first surface S1 at (e.g., in or on) the bendable area BA.

A gradual reduction of the lengths of the first and second dummy patterns 120a and 120b may be defined by a linear function, a sine function, a cosine function, or a logarithmic function. In other words, a line for connecting top ends or bottom ends of the grooves 121a in the first dummy patterns 120a to each other may be an oblique line, a sine curved line, a cosine curved line, or a logarithmic curved line. Further, a line for connecting top ends or bottom ends of the grooves 121b in the second dummy patterns 120b to each other may be an oblique line, a sine curved line, a cosine curved line, or a logarithmic curved line.

Referring to FIG. 2C, the first and second dummy patterns 120a and 120b may be arranged so that gaps s1, s2, and s3 between adjacent ones of the first and second dummy patterns 120a and 120b may be increased (e.g., may be gradually increased) as a distance from the bendable area BA increases. Regarding the grooves 121a and 121b forming the first and second dummy patterns 120a and 120b, and the soft portions 13a positioned in the grooves 121a and 121b, the gaps s1, s2, and s3 may be increased (e.g., may be gradually increased) as a distance from the bendable area BA increases.

For example, the second gap s2 between the adjacent dummy patterns provided near (e.g., adjacent to) the bendable area BA in first and second orders may be greater than the first gap s1 between one of the patterns 110 positioned at (e.g., in or on) an outermost part of the bendable area BA and the first order dummy pattern provided adjacent to the bendable area BA. Further, the third gap s3 between the adjacent dummy patterns provided away from the bendable area BA in second and third orders may be greater than the second gap s2. The first gap s1 may be greater than a gap s0 between adjacent ones of the patterns 110 at (e.g., in or on) the bendable area BA.

As described above, when the gaps between the first and second dummy patterns 120a and 120b are increased (e.g., are gradually increased), the color may not be abruptly changed around (e.g., near or adjacent to) the borders between the bendable area BA and the first and second flat areas FAa and FAb, and instead, the color may be gradually changed as a distance from the bendable area BA is increased. The gradual increase of the gaps between the first and second dummy patterns 120a and 120b may be combined with the gradual reduction of the lengths of the first and second dummy patterns 120a and 120b. In some embodiments, the lengths of the first and second dummy patterns 120a and 120b may be the same or substantially the same as each other, and the gaps between the first and second dummy patterns 120a and 120b may be gradually increased. The gradual increase of the gaps between the first and second dummy patterns 120a and 120b may be defined by a linear function, a sine function, a cosine function, or a logarithmic function.

Figure 3A:
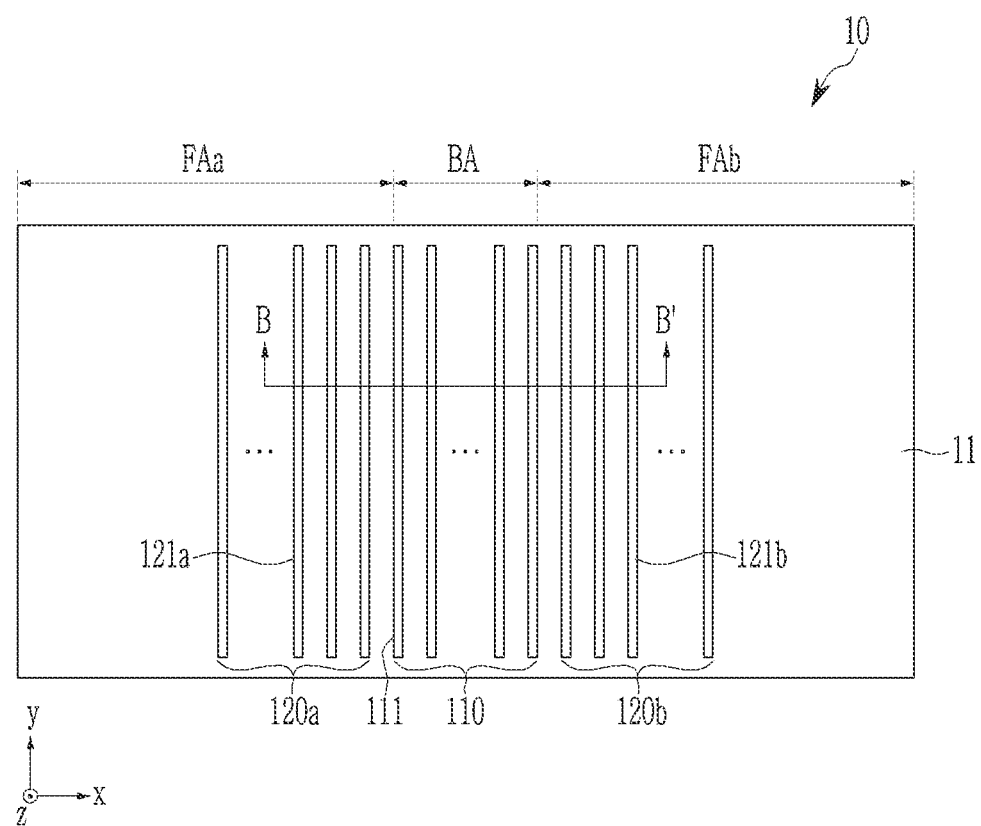
FIG. 3A shows a top plan view of a cover window according to an embodiment.
Figure 3B:
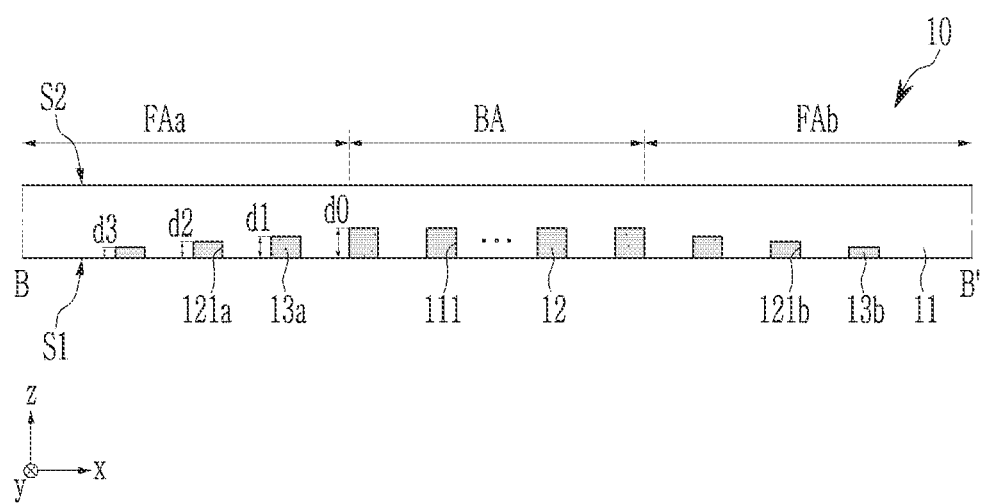
FIG. 3B shows a cross-sectional view taken along the line B-B' of FIG. 3A according to an embodiment.
Figure 3C:
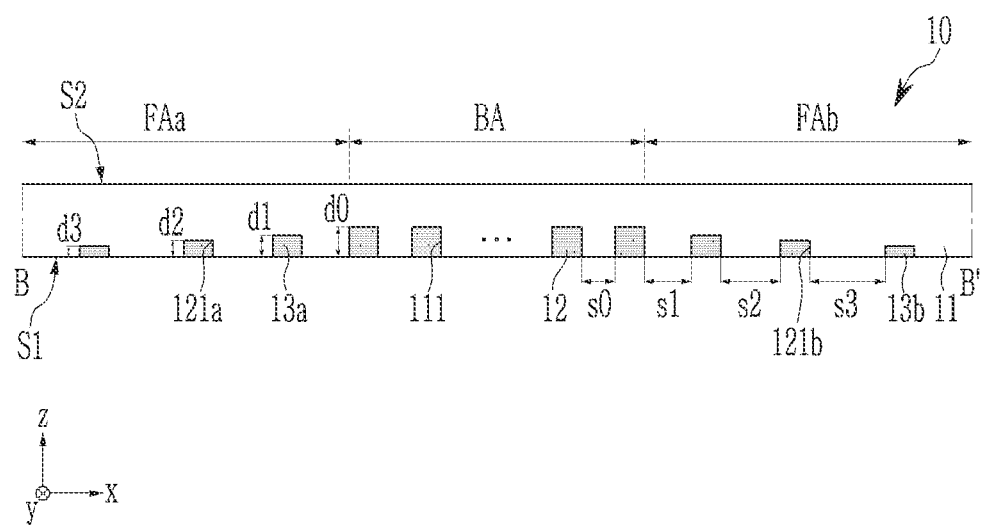
FIG. 3C shows a cross-sectional view taken along the line B-B' of FIG. 3A according to an embodiment.

FIG. 3A shows a top plan view of a cover window according to an embodiment. FIG. 3B and FIG. 3C show cross-sectional views taken along the line B-B' of FIG. 3A according to one or more embodiments.

Referring to FIG. 3A and FIG. 3B, similar to the above-described embodiments, the cover window 10 may include the first flat area FAa, the second flat area FAb, and the bendable area BA between the first flat area FAa and the second flat area FAb. The cover window 10 may include the patterns 110 at (e.g., in or on) the bendable area BA. The cover window 10 may further include first dummy patterns 120a at (e.g., in or on) the first flat area FAa, and second dummy patterns 120b at (e.g., in or on) the second flat area FAb. The patterns 110 may be the same or substantially the same as those of the above described embodiments, but the first and second dummy patterns 120a and 120b may be different from those of the above described embodiments.

Regarding the first dummy patterns 120a, grooves 121a are positioned on the base film 11 at (e.g., in or on) the first flat area FAa, and soft portions 13a are positioned in the grooves 121a. Regarding the second dummy patterns 120b, grooves 121b are positioned on the base film 11 at (e.g., in or on) the second flat area FAb, and soft portions 13b are positioned in the grooves 121b. The grooves 121a may have the same or substantially the same length as each other, and the grooves 121b may have the same or substantially the same length as each other. The grooves 121a and the grooves 121b may have the same or substantially the same length as each other. The grooves 121a and 121b may have the same or substantially the same length as that of the grooves 111 positioned at (e.g., in or on) the bendable area BA. However, the grooves 121a may have different depths from each other, and the grooves 121b may have different depths from each other.

In more detail, the depths d1, d2, and d3 may be formed to be reduced (e.g., to be gradually reduced) as a distance between the grooves 121a and the bendable area BA increases. For example, the depth d2 of the groove provided near the bendable area BA in the second order may be less than the depth d1 of the groove adjacent to the bendable area BA in the first order, and the depth d3 of the groove provided away from the bendable area BA in the third order may be less than the depth d2 of the groove provided near the bendable area BA in the second order. The depth d1 of the groove provided adjacent to the bendable area BA in the first order may be less than the depth d0 of the groove 111 at (e.g., in or on) the bendable area BA. Similarly, the grooves 121b may be formed to have the depths that are reduced (e.g., that are gradually reduced) as a distance from the bendable area BA increases. The soft portions 13a and 13b positioned in the grooves 121a and 121b may have the thicknesses that are reduced (e.g., that are gradually reduced) as the distance from the bendable area BA increases.

As described above, when the depths and the thicknesses of the grooves 121a and 121b configuring the first and second dummy patterns 120a and 120b, and the soft portions 13a and 13b, are gradually reduced as the distance from the bendable area BA increases, a volume of the soft portions 13a and 13b may be gradually reduced as the distance from the bendable area BA increases. Therefore, the color change caused by the refractive index may be gradually progressed as it becomes different from the bendable area BA, so when the patterns 110 are formed (e.g., are made) at (e.g., in or on) the bendable area BA so as to improve the flexible characteristics of the bendable area BA, the user may fail to recognize the color difference between the bendable area BA and the first and second flat areas FAa and FAb, or may have more difficulty in recognizing the color difference.

A gradual reduction of the depth of the grooves 121a and 121b and a gradual reduction of the thickness of the soft portions 13a and 13b may be defined by a linear function, a sine function, a cosine function, or a logarithmic function.

Referring to FIG. 3C, the first and second dummy patterns 120a and 120b may be arranged so that the gaps s1, s2, and s3 may be gradually increased as a distance from the bendable area BA increases. The second gap s2 between the dummy patterns provided near the bendable area BA in the first and second orders may be greater than the first gap s1 between the one pattern 110 positioned at (e.g., in or on) the outermost part of the bendable area BA and the dummy pattern provided adjacent to the bendable area BA in the first order. Also, the third gap s3 between the adjacent dummy patterns provided away from the bendable area BA in the second and third orders may be greater than the second gap s2. The first gap s1 may be greater than the gap s0 between adjacent ones of the patterns 110 at (e.g., in or on) the bendable area BA.

As described above, when the gaps between the first and second dummy patterns 120a and 120b are gradually increased, the color is not abruptly changed around the borders between the bendable area BA and the first and second flat areas FAa and FAb, and may be gradually changed as the distance from the bendable area BA increases. A gradual increase of the gaps between the first and second dummy patterns 120a and 120b may be combined with a gradual reduction of the depths of the grooves 121a and 121b. In some embodiments, the depths of the grooves 121a and 121b may be constant or substantially constant, and the gaps between the first and second dummy patterns 120a and 120b may be gradually increased. A gradual increase of the gaps between the first and second dummy patterns 120a and 120b may be defined by a linear function, a sine function, a cosine function, or a logarithmic function.

Figure 4A:
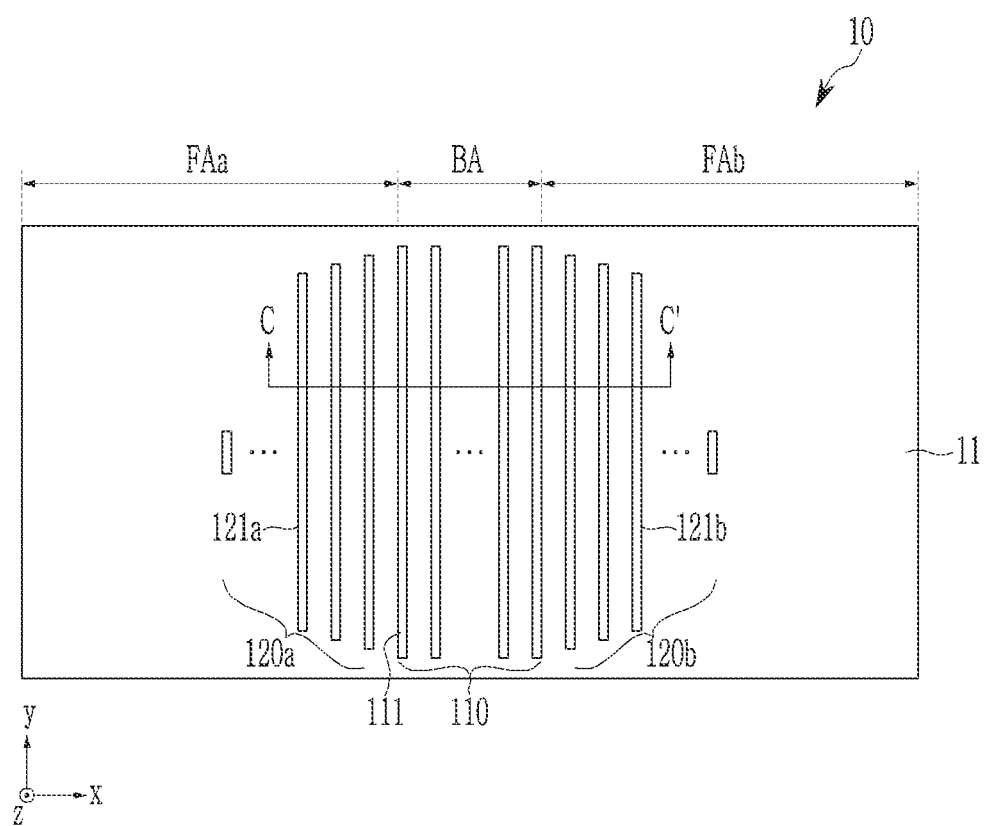
FIG. 4A shows a top plan view of a cover window according to an embodiment.
Figure 4B:
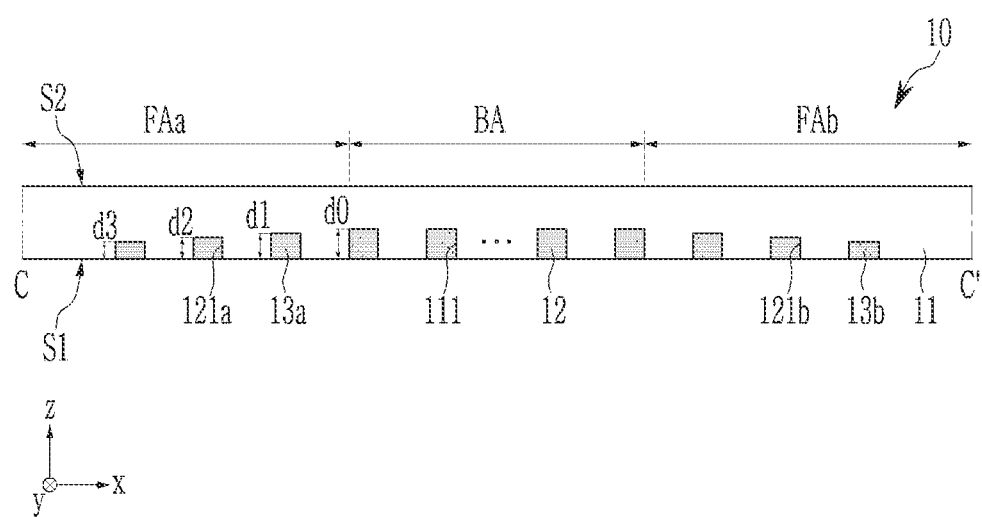
FIGS. 4B-4C show cross-sectional views taken along the line C-C' of FIG. 4A according to one or more embodiments.
Figure 4C:
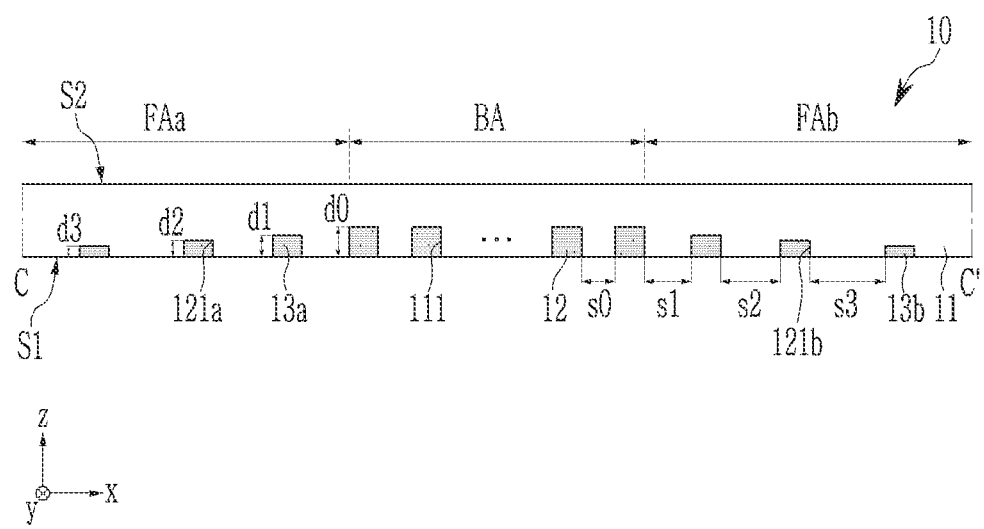

FIG. 4A shows a top plan view of a cover window according to an embodiment. FIG. 4B and FIG. 4C show cross-sectional views taken along the line C-C' of FIG. 4A according to one or more embodiments.

Referring to FIG. 4A and FIG. 4B, similar to those of the above-described embodiments, the cover window 10 may include the first flat area FAa, the second flat area FAb, and the bendable area BA between the first flat area FAa and the second flat area FAb. The cover window 10 may include the patterns 110 at (e.g., in or on) the bendable area BA. The cover window 10 may further include first dummy patterns 120a at (e.g., in or on) the first flat area FAa, and second dummy patterns 120b at (e.g., in or on) the second flat area FAb. Compared to the above-described embodiments, the patterns 110 may be the same or substantially the same, but the first and second dummy patterns 120a and 120b may be different.

Regarding the first dummy patterns 120a, grooves 121a are positioned in the base film 11 at (e.g., in or on) the first flat area FAa, and soft portions 13a are positioned in the grooves 121a. Regarding the second dummy patterns 120b, grooves 121b are positioned in the base film 11 at (e.g., in or on) the second flat area FAb, and soft portions 13b are positioned in the grooves 121b.

The lengths of the first dummy patterns 120a, and the grooves 121a and the soft portions 13a forming the first dummy patterns 120a, may be reduced (e.g., may be gradually reduced) as a distance from the bendable area BA increases. Further, the depths d1, d2, and d3 and the thicknesses of the grooves 121a and the soft portions 13a may be reduced (e.g., may be gradually reduced) as the distance from the bendable area BA increases. Similarly, the lengths of the second dummy patterns 120b, and the grooves 121b and the soft portions 13b forming the second dummy patterns 120b, may be reduced (e.g., may be gradually reduced) as a distance from the bendable area BA increases. Further, the depths and the thicknesses of the grooves 121b and the soft portions 13b may be reduced (e.g., may be gradually reduced) as the distance from the bendable area BA increases.

As described above, when the lengths, the depths, and the thickness of the grooves 121a and 121b configuring the first and second dummy patterns 120a and 120b, and the soft portions 13a and 13b, are gradually reduced as the distance from the bendable area BA increases, the color may not be abruptly changed around the borders between the bendable area BA and the first and second flat areas FAa and FAb, and instead, may be gradually changed as the distance from the bendable area BA increases. Therefore, when the patterns 110 are positioned at (e.g., in or on) the bendable area BA so as to improve the flexible characteristics of the bendable area BA, the user may fail to recognize the color difference between the bendable area BA and the first and second flat areas FAa and FAb, or may have more difficulty in recognizing the color difference.

The gradual reduction of the lengths and the depths of the grooves 121a and 121b, and the gradual reduction of the lengths and the thicknesses of the soft portions 13a and 13b, may be defined by a linear function, a sine function, a cosine function, or a logarithmic function.

Referring to FIG. 4C, the first and second dummy patterns 120a and 120b may be arranged so that the gaps s1, s2, and s3 may be increased (e.g., may be gradually increased) as a distance from the bendable area BA increases. The second gap s2 between the dummy patterns provided near the bendable area BA in the first and second orders may be greater than the first gap s1 between the one pattern 110 positioned at (e.g., in or on) the outermost part of the bendable area BA and the dummy pattern provided adjacent to the bendable area BA in the first order. Also, the third gap s3 between the dummy patterns provided away from the bendable area BA in the second and third orders may be greater than the second gap s2. The first gap s1 may be greater than the gap s0 between adjacent ones of the patterns 110 at (e.g., in or on) the bendable area BA.

As described above, when the gaps between the first and second dummy patterns 120a and 120b are gradually increased, the color may not be abruptly changed around the borders between the bendable area BA and the first and second flat areas FAa and FAb, and may be gradually changed as the distance from the bendable area BA increases. A gradual increase of the gaps between the first and second dummy patterns 120a and 120b may be combined with a gradual reduction of the lengths and the depths of the grooves 121a and 121b.

Figure 5A:
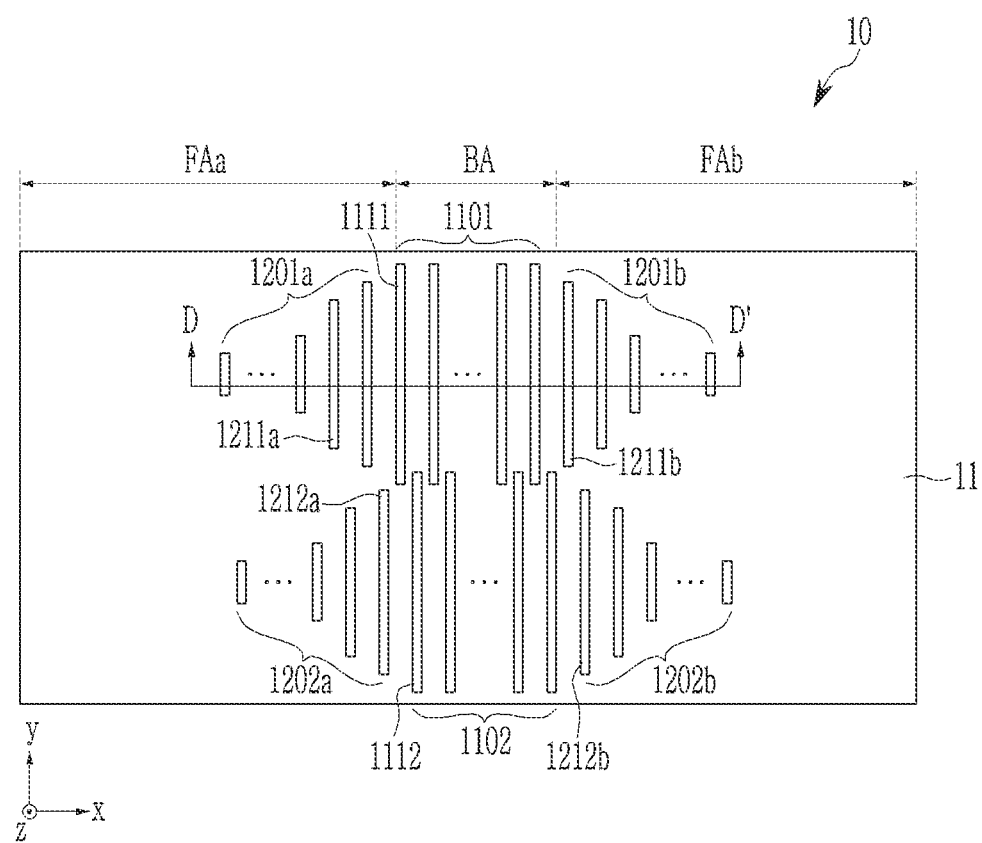
FIG. 5A shows a top plan view of a cover window according to an embodiment.

FIG. 5A shows a top plan view of a cover window according to an embodiment. FIG. 5B, FIG. 5C, FIG. 5D, and FIG. 5E show cross-sectional views taken along the line D-D' of FIG. 5A according to one or more embodiments.

Figure 5B:
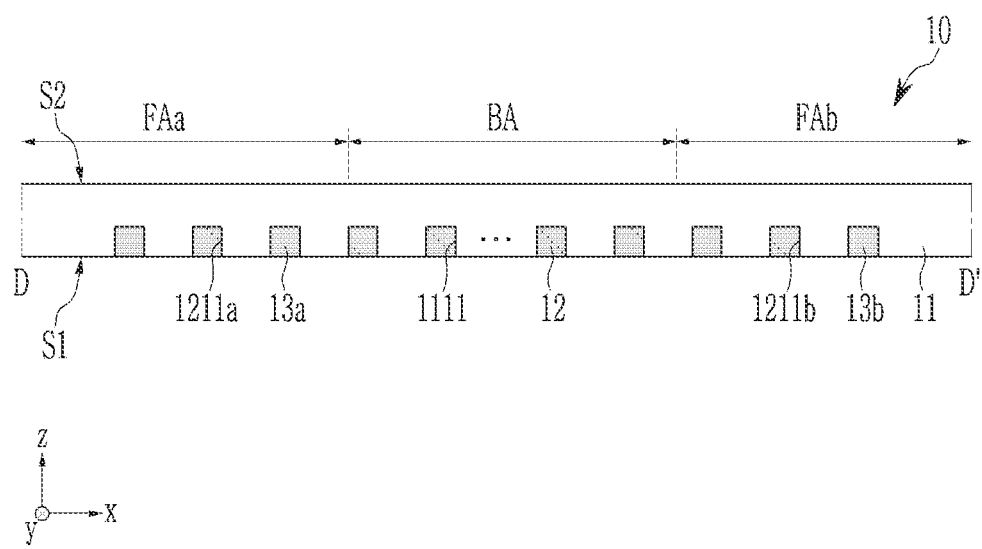
FIGS. 5B-5E show cross-sectional views taken along the line D-D' of FIG. 5A according to one or more embodiments.
Figure 5C:
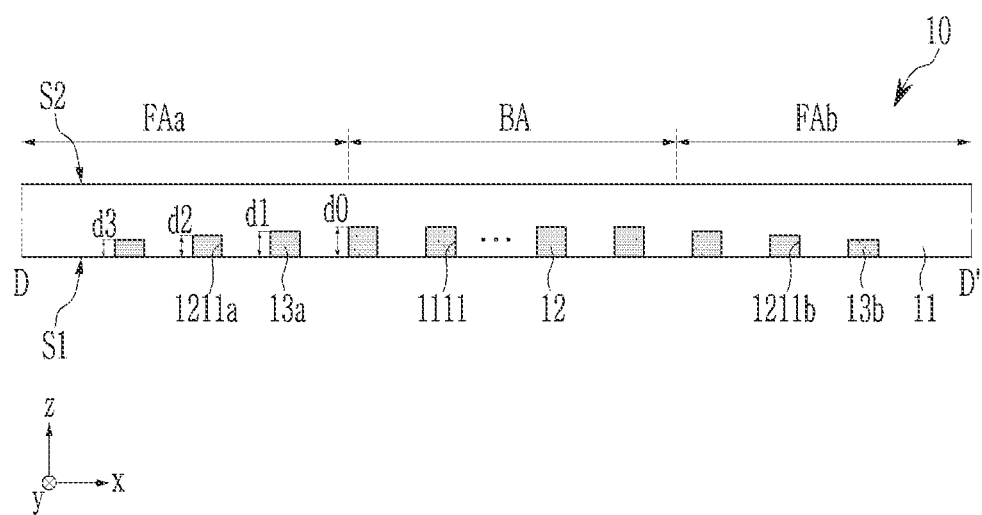

Referring to FIG. 5A, FIG. 5B, and FIG. 5C, the cover window 10 may include patterns 1101 and 1102, first dummy patterns 1201a and 1202a, and second dummy patterns 1201b and 1202b that are arranged in two rows in the second direction x. In more detail, the cover window 10 may include the patterns 1101 and 1102 at (e.g., in or on) the bendable area BA, the first dummy patterns 1201a and 1202a at (e.g., in or on) the first flat area FAa, and the second dummy patterns 1201b and 1202b at (e.g., in or on) the second flat area FAb.

The patterns 1101 in the first row and the patterns 1102 in the second row may be alternately disposed along the first direction x. The patterns 1101 in the first row and the patterns 1102 in the second row may include a portion overlapping with each other in the first direction x.

The first dummy patterns 1201a in the first row and the first dummy patterns 1202a in the second row may be alternately disposed along the first direction x. The second dummy patterns 1201b in the first row and the second dummy patterns 1202b in the second row may be alternately disposed along the first direction x. Similar to the above-described embodiments, grooves 1111, 1112, 1211a, 1212a, 1211b, and 1212b may be formed to be concave in the base film 11. Soft portions 12, 13a, and 13b may be positioned in the grooves 1111, 1112, 1211a, 1212a, 1211b, and 1212b.

The lengths of the first dummy patterns 1201a and 1202a in the respective rows may be reduced (e.g., may be gradually reduced) as a distance from the bendable area BA is increased. The depths of the grooves 1211a and 1212a may be the same or substantially the same as each other as shown in FIG. 5B, or may be reduced (e.g., may be gradually reduced) as a distance from the bendable area BA increases as shown in FIG. 5C. The lengths of the second dummy patterns 1201b and 1202b in the respective rows may be reduced (e.g., may be gradually reduced) as a distance from the bendable area BA increases. The depths of the grooves 1211b and 1212b may be the same or substantially the same as each other as shown in FIG. 5B, or may be reduced (e.g., may be gradually reduced) as a distance from the bendable area BA increases as shown in FIG. 5C. According to the present embodiments, the color may not be abruptly changed around the corner between the bendable area BA and the first and second flat areas FAa and FAb, and may be gradually changed as the distance from the bendable area BA increases. Therefore, when the patterns 1101 and 1102 are positioned at (e.g., in or on) the bendable area BA so as to improve the flexible characteristics of the bendable area BA, the user may fail to recognize the color difference between the bendable area BA and the first and second flat areas FAa and FAb, or may have more difficulty in recognizing the color difference.

However, the present disclosure is not limited to the two rows shown in FIG. 5A, and the cover window 10 may include the patterns arranged in at least three rows, and the first and second dummy patterns. When the patterns are disposed in a plurality of rows, the flexible characteristics may be more improved compared to when the patterns are disposed in a single row.

Figure 5D:
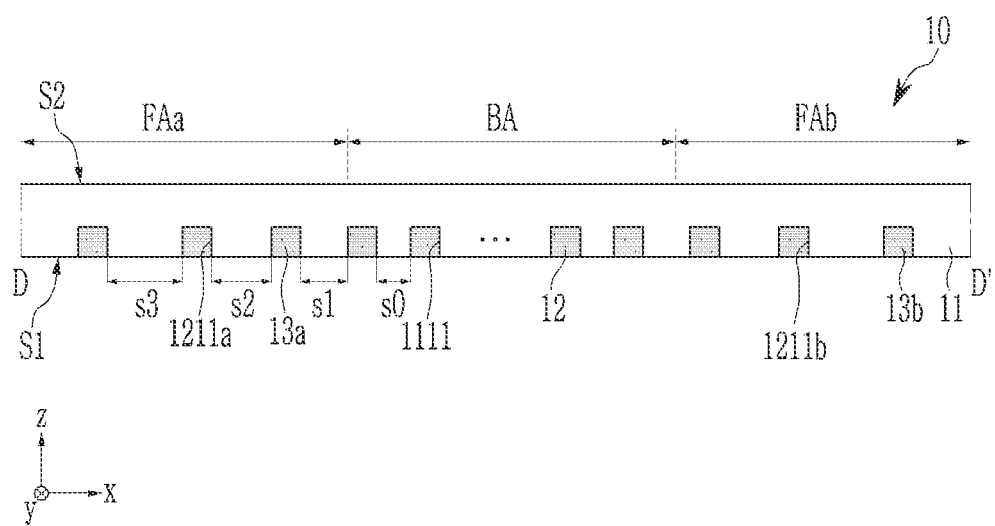
Figure 5E:
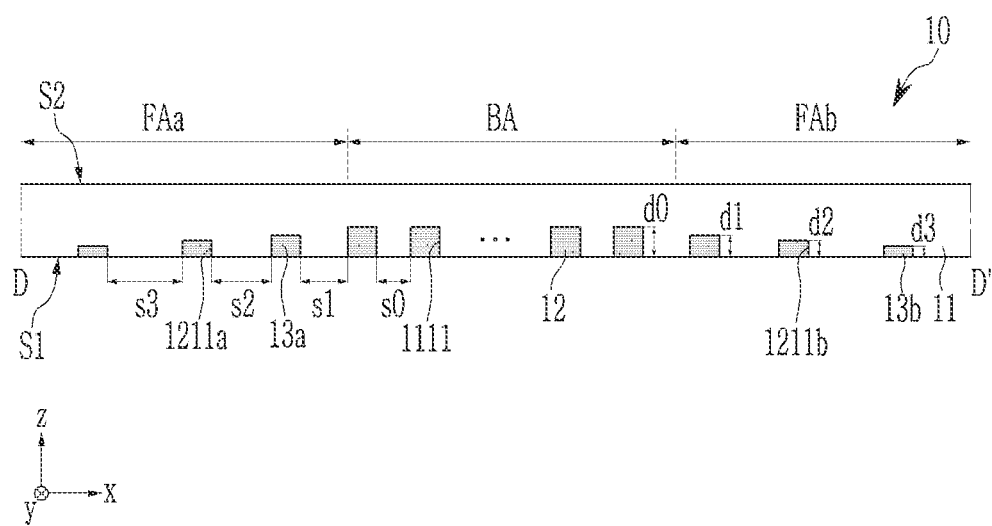

Referring to FIG. 5D and FIG. 5E, the first and second dummy patterns 1201a, 1202a, 1201b, and 1202b in the respective rows may be disposed so that the gaps s1, s2, and s3 may be increased (e.g., may be gradually increased) as the distance from the bendable area BA increases. A gradual increase of the gaps of the first and second dummy patterns 1201a, 1202a, 1201b, and 1202b may be combined with a gradual reduction of the lengths of the first and second dummy patterns 1201a, 1202a, 1201b, and 1202b. A gradual increase of the gaps of the first and second dummy patterns 1201a, 1202a, 1201b, and 1202b may be combined with a gradual reduction of the lengths of the first and second dummy patterns 1201a, 1202a, 1201b, and 1202b, and with a gradual reduction of the depths of the grooves 1211a, 1212a, 1211b, and 1212b.

Figure 6A:
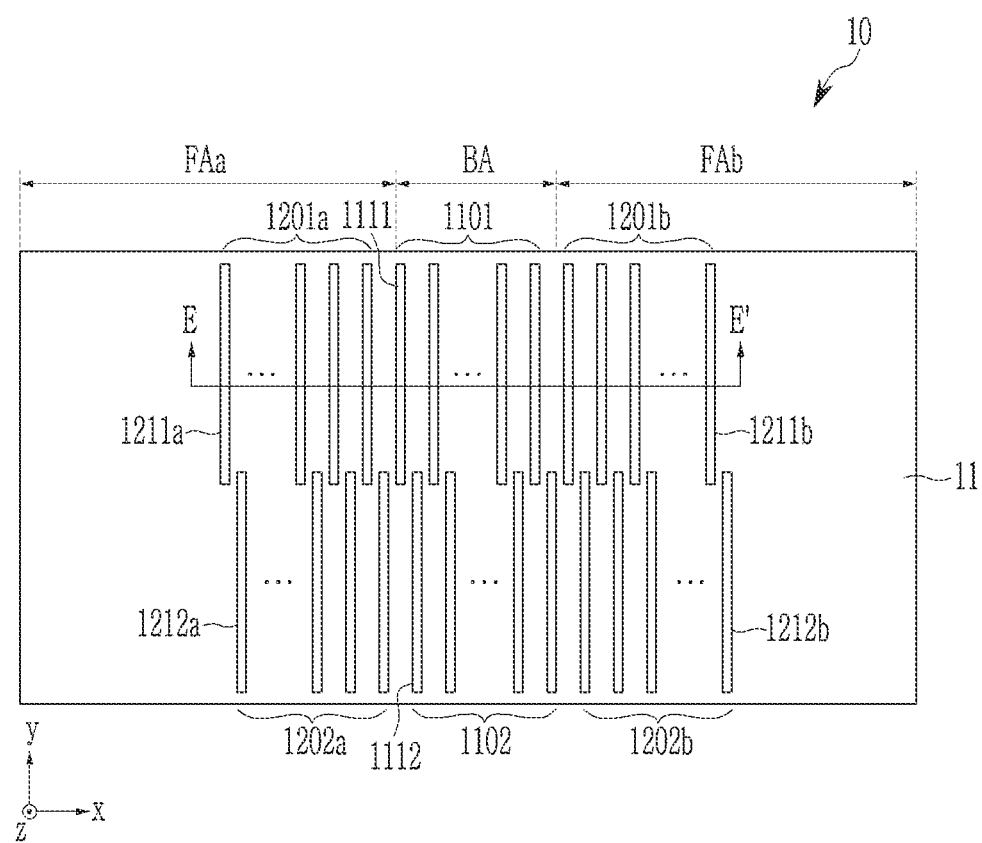
FIG. 6A shows a top plan view of a cover window according to an embodiment.
Figure 6B:
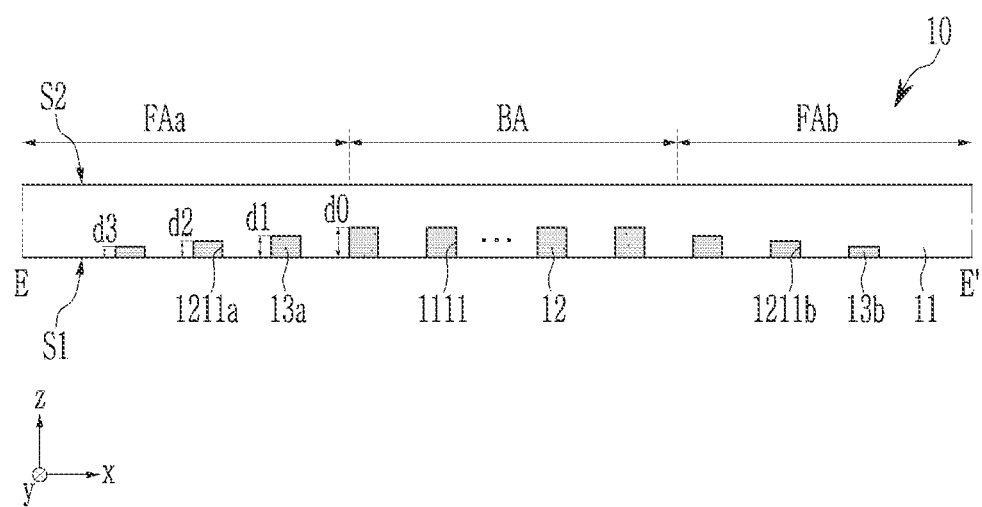
FIGS. 6B-6C show cross-sectional views taken along the line E-E' of FIG. 6A according to one or more embodiments.
Figure 6C:
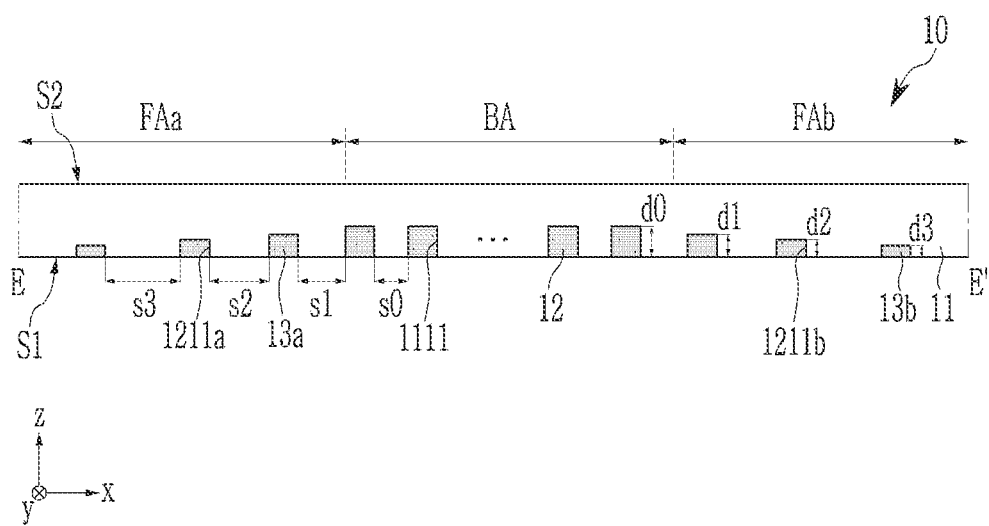

FIG. 6A shows a top plan view of a cover window according to an embodiment. FIG. 6B and FIG. 6C show cross-sectional views taken along the line E-E' of FIG. 6A according to one or more embodiments.

Referring to FIG. 6A and FIG. 6B, similar to the embodiment shown in FIG. 5A, the cover window 10 may include the patterns 1101 and 1102 arranged in two rows. The cover window 10 may further include first dummy patterns 1201a and 1202a, and second dummy patterns 1201b and 1202b.

The first dummy patterns 1201a and 1202a of the respective rows have the same or substantially the same length as each other, but the depths d1, d2, and d3 of the grooves 1211a and 1212a may be reduced (e.g., may be gradually reduced) as the distance from the bendable area BA increases. Similarly, the second dummy patterns 1201b and 1202b in the respective rows have the same or substantially the same length as each other, but the depths of the grooves 1211b and 1212b may be reduced (e.g., may be gradually reduced) as the distance from the bendable area BA increases. When the first and second dummy patterns 1201a, 1202a, 1201b, and 1202b are formed according to the present embodiment, the color may not be abruptly changed around the borders between the bendable area BA and the first and second flat areas FAa and FAb, and may be gradually changed as the distance from the bendable area BA increases. Therefore, the user may fail to recognize the color difference between the bendable area BA and the first and second flat areas FAa and FAb, or may have more difficulty in recognizing the color difference.

Referring to FIG. 6C, the first and second dummy patterns 1201a, 1202a, 1201b, and 1202b in the respective rows may be disposed so that the gaps s1, s2, and s3 may be increased (e.g., may be gradually increased) as the distance from the bendable area BA increases. A gradual increase of the gaps of the first and second dummy patterns 1201a, 1202a, 1201b, and 1202b may be combined with a gradual reduction of the depths of the grooves 1211a, 1212a, 1211b, and 1212b.

Figure 7:
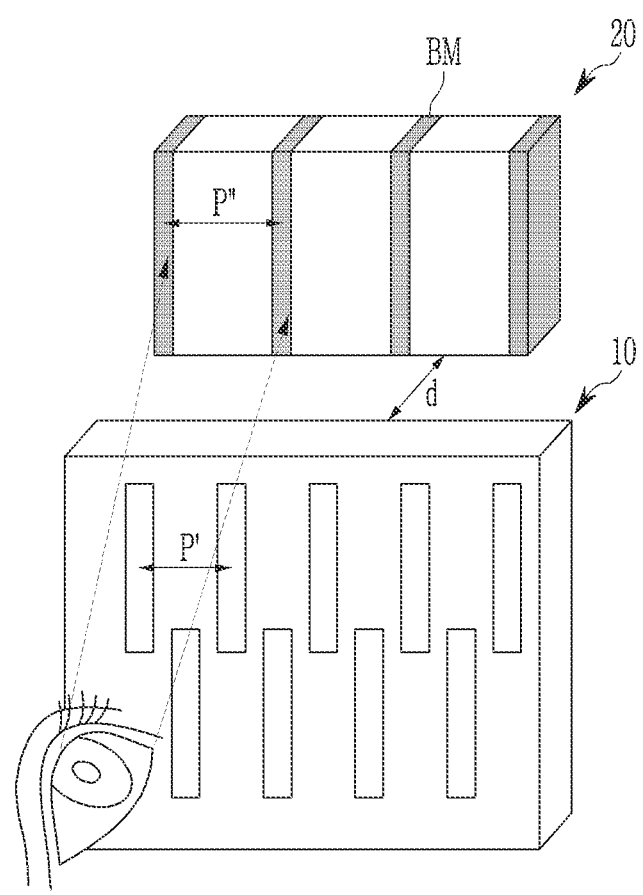
FIG. 7 shows a schematic view of a generation of a moiré.

FIG. 7 shows a schematic view of a generation of a moiré.

Referring to FIG. 7, black matrices BM, which are regions in which light is not emitted between the pixels, are regularly positioned on the display panel 20. When the above-described patterns of the cover window 10 are regularly disposed, a moiré that is an interference pattern that may be visible according to a difference between a period of the patterns and a period of the black matrices BM may be generated.

The period of the patterns relating to the moiré and the period of the black matrix are not actual pitches, but may be apparent pitches, or in other words, an apparent pitch P' of the patterns and an apparent pitch P''' of the black matrix. The apparent pitches P' and P''' are changeable according to a distance d between the patterns of the cover window 10 and the black matrices of the display panel 20. Therefore, the apparent pitches P' and P''' are calculated based on the distance d between the patterns of the cover window 10 and the black matrices of the display panel 20 in the display device, and the pitches of the patterns for preventing or reducing the generation of the moiré may be deduced through a frequency analysis based on the calculated apparent pitches P' and P'''. For example, to prevent or reduce the generation of the moiré in the above-described embodiments, the patterns 110, 1101, and 1102 of the bendable area BA of the cover window 10, the first dummy patterns 120a, 1201a, and 1202a of the first flat area FAa, and the second dummy patterns 120b, 1201b, and 1202b of the second flat area FAb may be arranged with the above-deduced pitches.

Figure 8:
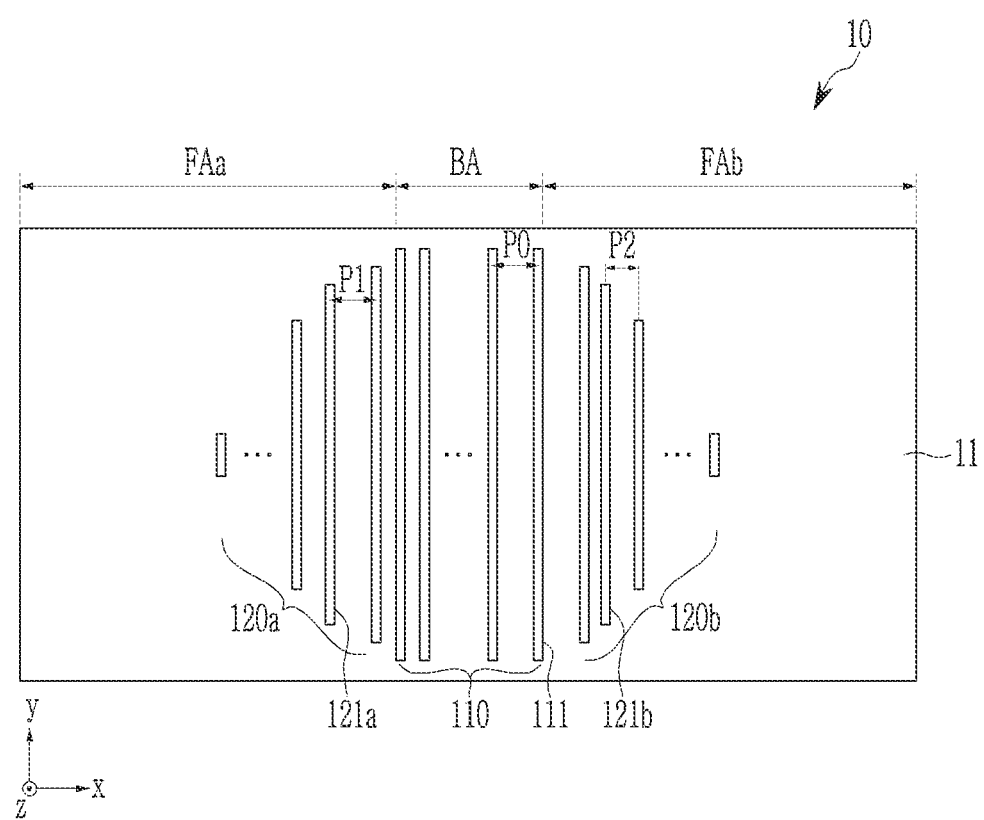
FIG. 8 shows a top plan view of a cover window according to an embodiment.

FIG. 8 shows a top plan view of a cover window according to an embodiment.

The embodiment described hereinafter with reference to FIG. 8 may be the same or substantially the same as (e.g., may be generally similar to) the embodiment described above with reference to FIG. 2A, except that a pitch P0 of the patterns 110, a pitch P1 of the first dummy patterns 120a, and a pitch P2 of the second dummy patterns 120b may be different. In more detail, the patterns 110 positioned at (e.g., in or on) the bendable area BA may be arranged with a random pitch P0. Further, the first dummy patterns 120a positioned at (e.g., in or on) the first flat area FAa may be arranged with a random pitch P1, and the second dummy patterns 120b positioned at (e.g., in or on) the second flat area FAb may be arranged with a random pitch P2. Therefore, the gaps among the adjacent patterns 110, the first dummy patterns 120a, and the second dummy patterns 120b (e.g., and also the gaps among the grooves 111, 121a, and 121b) may not be uniform, and the patterns 110, the first dummy patterns 120a, and the second dummy patterns 120b may be arranged with irregular gaps therebetween.

When the patterns 110, the first dummy patterns 120a, and the second dummy patterns 120b are arranged with the random pitches P0, P1, and P2 therebetween, the patterns 110 and the first and second dummy patterns 120a and 120b are irregularly arranged, so that the generation of the moiré may be prevented or substantially prevented when the black matrices BM of the display panel 20 are regularly arranged. The pitches P0, P1, and P2 may prevent or reduce the generation of the moiré described above with reference to FIG. 7, and may be randomly selected from among the deduced pitches. The pitches P0, P1, and P2 may be within a suitable range (e.g., a predetermined range) by considering the widths of the grooves 111, 121a, and 121b, and the flexible characteristics of the bendable area BA. For example, the pitches P0, P1, and P2 may be within a range of about 50 μm to about 200 μm. The arrangement of the patterns 110, the first dummy patterns 120a, and the second dummy patterns 120b with the random pitches P0, P1, and P2 for preventing or reducing the generation of the moiré may also be applicable to one or more of the above described embodiments, for example, such as those described above with reference to FIG. 3A, FIG. 4A, FIG. 5A, and FIG. 6A.

Figure 9A:
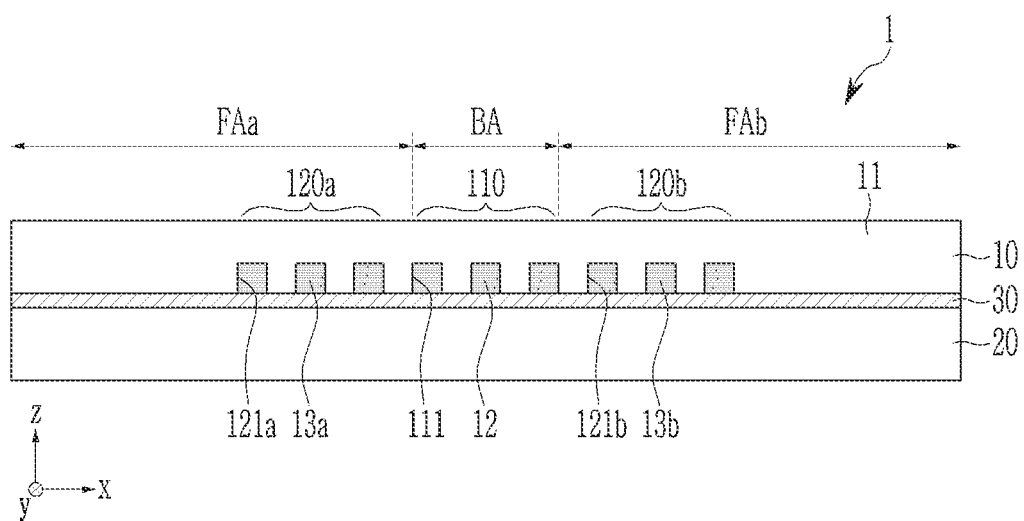
FIGS. 9A-9C show cross-sectional views of a display device according to one or more embodiments.
Figure 9B:
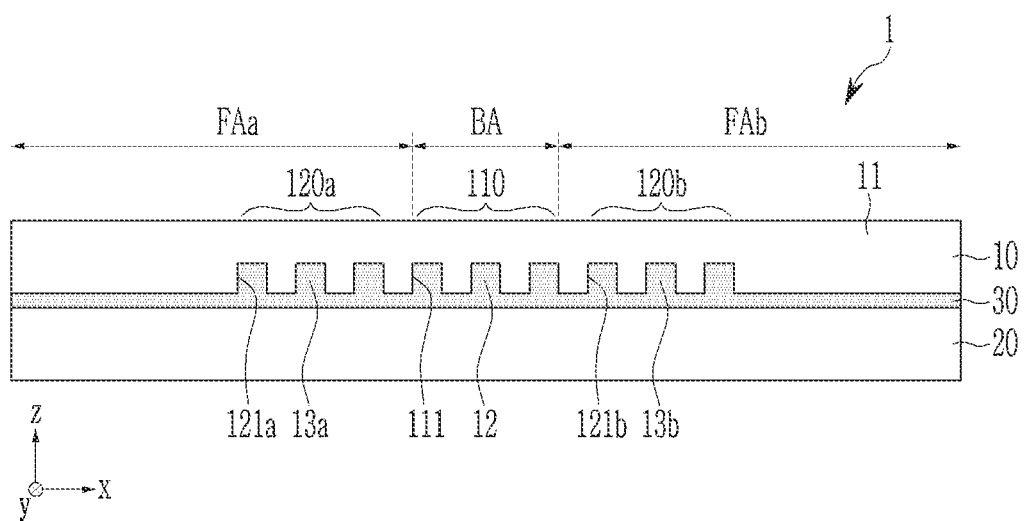
Figure 9C:
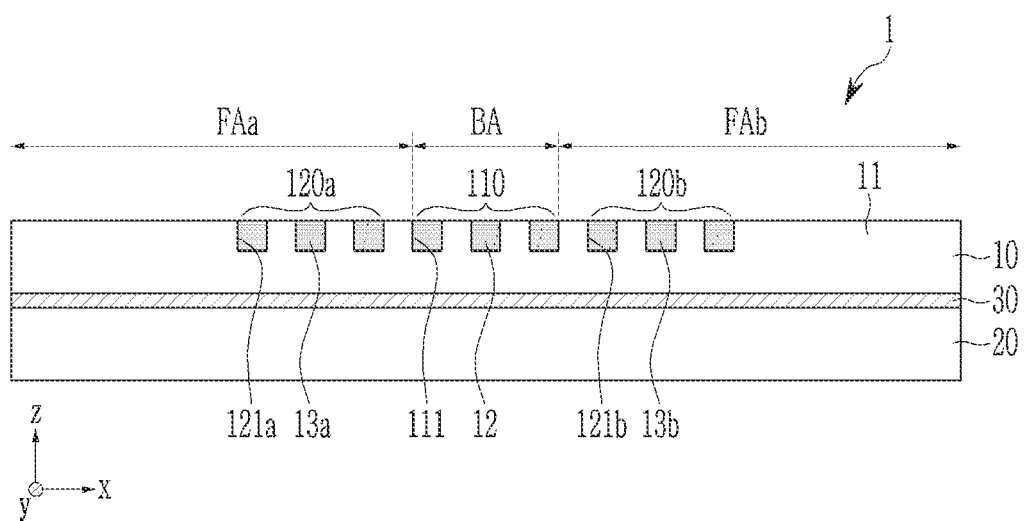

FIG. 9A, FIG. 9B, and FIG. 9C show cross-sectional views of a display device according to one or more embodiments.

Referring to FIG. 9A, the display device 1 may include a cover window 10, a display panel 20, and an adhesive layer 30 between the cover window 10 and the display panel 20.

The display panel 20 may be an emission display panel, and may be attached to the cover window 10 by the adhesive layer 30. The adhesive layer 30 may include an optical clear adhesive (OCA), an optical clear resin (OCR), and/or a pressure sensitive adhesive (PSA). The cover window 10 may be one of the cover windows 10 described with reference to the embodiments above. The cover window 10 may include the patterns 110 at (e.g., in or on) the bendable area BA, the first dummy patterns 120a at (e.g., in or on) the first flat area FAa, and the second dummy patterns 120b at (e.g., in or on) the second flat area FAb. The patterns 110, the first dummy patterns 120a, and the second dummy patterns 120b may include any suitable number of a plurality of grooves 111, 121a, and 121b, but for convenience of illustration, three grooves 111, 121a, and 121b are shown as being positioned at (e.g., in or on) each of the respective regions.

The cover window 10 may be attached to the display panel 20, so that the grooves 111, 121a, and 121b (e.g., an opening thereof) may face the display panel 20. When attached as shown in the figures, a surface of the cover window 10 that is exposed to the outside from the display device 1 includes (e.g., is made of) a surface of the base film 11, thereby providing excellent surface quality. Further, the adhesive layer 30 may block the grooves 111, 121a, and 121b from contacting moisture to prevent or substantially prevent the growth of cracks in the grooves 111, 121a, and 121b. The soft portions 12 in the grooves 111 may stretch further than the base film 11, so that in-folding of the display device 1 may be improved.

Referring to FIG. 9B, the soft portions 12, 13a, and 13b positioned in the grooves 111, 121a, and 121b of the cover window 10 may be a part of the adhesive layer 30. In this case, the soft portions 12, 13a, and 13b may be formed, for example, by applying an adhesive on the surface in which the grooves 111, 121a, and 121b of the cover window 10 are positioned, and/or on the surface of the display panel 20, and then bonding the cover window 10 and the display panel 20 to each other, and curing the adhesive. The adhesive layer 30 may have a refractive index corresponding to (e.g., that matches) that of the cover window 10, so that light may not be refracted by the adhesive layer 30.

Referring to FIG. 9C, the display panel 20 may be attached to the cover window 10, so that the grooves 111, 121a, and 121b (e.g., an opening thereof) may not face the display panel 20. In other words, the cover window 10 and the display panel 20 may be attached to each other so that the grooves 111, 121a, and 121b may be exposed to the outside of the display device 1. When the grooves 111, 121a, and 121b face the outside of the display device 1, the refractive index matched soft portions 12, 13a, and 13b are positioned in the grooves 111, 121a, and 121b, so the image displayed by the display panel 20 may not be distorted by the cover window 10.

Figure 10A:
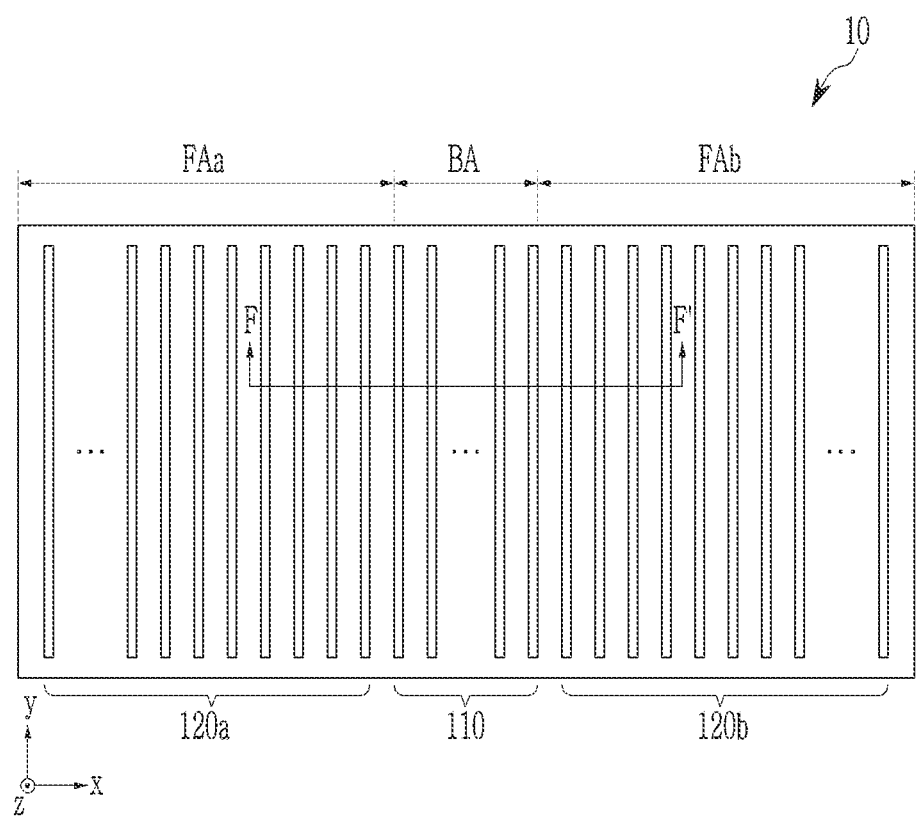
FIG. 10A shows a top plan view of a cover window according to an embodiment.
Figure 10B:
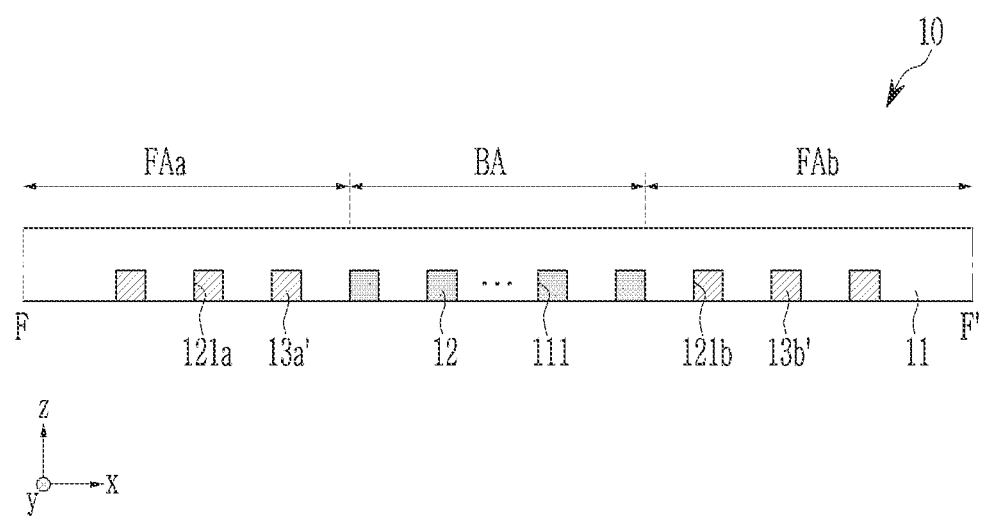
FIG. 10B shows a cross-sectional view taken along the line F-F' of FIG. 10A.

FIG. 10A shows a top plan view of a cover window according to an embodiment, and FIG. 10B shows a cross-sectional view taken along the line F-F' of FIG. 10A.

Referring to FIG. 10A and FIG. 10B, the cover window 10 may include the bendable area BA, the first flat area FAa, and the second flat area FAb. Similar to those of the above-described embodiments, the cover window 10 may include the patterns 110 at (e.g., in or on) the bendable area BA. The patterns 110 may include the grooves 111 positioned in the base film 11, and the soft portions 12 positioned in the grooves 111.

The cover window 10 may further include first dummy patterns 120a and second dummy patterns 120b at (e.g., in or on) the first flat area FAa and the second flat area FAb, respectively. The first dummy patterns 120a may be disposed at (e.g., in or on) an entirety of the first flat area FAa, in addition to a peripheral portion of the bendable area BA. The second dummy patterns 120b may be dispose at (e.g., in or on) an entirety of the second flat area FAb. The first and second dummy patterns 120a and 120b may include the grooves 121a and 121b positioned in the base film 11, and hard portions 13a' and 13b' positioned in the grooves 121a and 121b.

The grooves 121a may have the same or substantially the same length as each other, and the grooves 121b may have the same or substantially the same length as each other. The grooves 121a may have the same or substantially the same length as that of the grooves 121b. The grooves 121a and 121b may have the same or substantially the same length as that of the grooves 111. The grooves 121a and 121b may have the same or substantially the same depth as that of the grooves 111.

The hard portions 13a' and 13b' may have a greater rigidity than that of the soft portions 12. For example, the soft portions 12 may have the pencil hardness that is equal to or less than 4B, and the hard portions 13a' and 13b' may have a pencil hardness that is equal to or greater than 7H. The refractive indices of the hard portions 13a' and 13b' may correspond to (e.g., may match) the refractive index of the base film 11. For example, the hard portions 13a' and 13b' may have the same or substantially the same refractive index as that of the base film 11 for the wavelength of about 550 nm.

According to the embodiment described with reference to FIGS. 10A and 10B, the patterns 110 that may cause the color difference, and the first and second dummy patterns 120a and 120b are disposed at (e.g., in or on) an entirety of the cover window 10, so that the entire region of the cover window 10 may be observed to have the same or substantially the same color. The hard portions 13a' and 13b' are filled in the grooves 121a and 121b of the first and second dummy patterns 120a and 120b, so when the first and second dummy patterns 120a and 120b are positioned at (e.g., in or on) an entirety of the first and second flat areas FAa and FAb, an impact resistance of the cover window 10 may be improved (e.g., may be prevented or substantially prevented from being deteriorated).

A configuration of the display panel 20 included in a display device according to an embodiment will now be described in more detail, with a focus on the display area DA.

Figure 11:
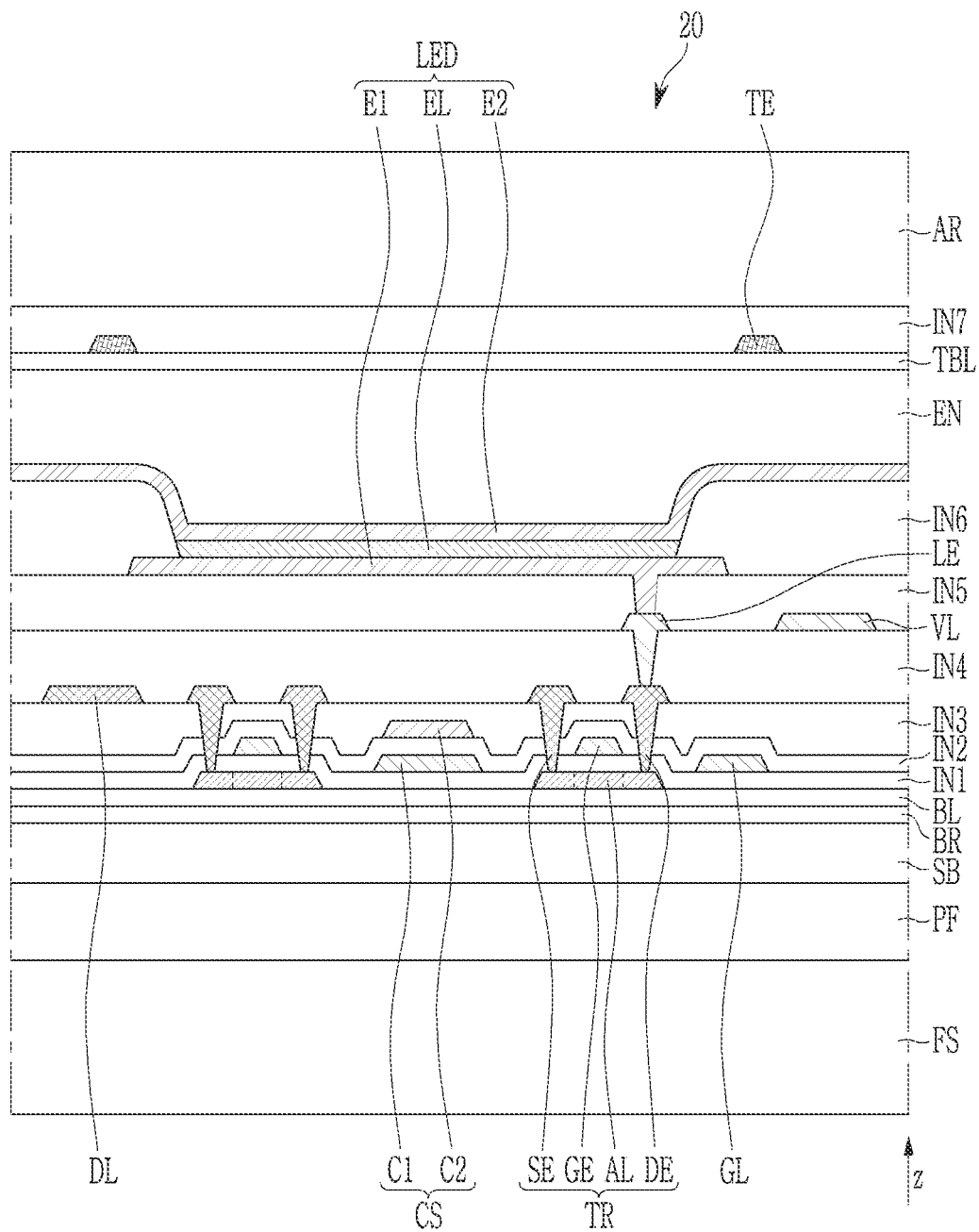
FIG. 11 shows a cross-sectional view of a stacked structure of a display panel according to an embodiment.

FIG. 11 shows a cross-sectional view of a stacked structure of a display panel according to an embodiment. The cross-section shown in FIG. 11 may correspond to one pixel area.

The display panel 20 includes a substrate SB, a transistor TR positioned on the substrate SB, and a light emitting diode LED connected to the transistor TR. The light emitting diode LED may correspond to one pixel.

The substrate SB may be a flexible substrate including (e.g., made of) various suitable polymers, for example, such as a polyimide, a polyamide, or a polyethylene terephthalate.

A barrier layer BR for preventing or reducing moisture and/or oxygen from permeating therethrough may be positioned on the substrate SB. The barrier layer BR may include an inorganic insulating material, for example, such as a silicon nitride ($SiN_x$), a silicon oxide ($SiO_x$), or a silicon oxynitride ($SiO_xN_y$), and may have a single layer structure or a multilayered structure.

A buffer layer BL may be positioned on the barrier layer BR. The buffer layer BL may block or substantially block impurities from the substrate SB when a semiconductor layer is formed, thereby improving the characteristic of the semiconductor layer, and may flatten or substantially flatten the surface of the substrate SB, thereby relaxing a stress of the semiconductor layer. The buffer layer BL may include an inorganic insulating material, for example, such as a silicon nitride, a silicon oxide, or a silicon oxynitride, and may have a single layer structure or a multilayered structure. For example, the buffer layer BL may include amorphous silicon (Si).

A semiconductor layer AL of the transistor TR may be positioned on the buffer layer BL. The semiconductor layer AL may include a first region, a second region, and a channel region between the first and second regions. The semiconductor layer AL may include one from among amorphous silicon, polysilicon, and/or an oxide semiconductor. For example, the semiconductor layer AL may include low temperature polysilicon (LTPS), or may include an oxide semiconductor material including at least one from among zinc (Zn), indium (In), gallium (Ga), and/or tin (Sn). For example, the semiconductor layer AL may include an indium-gallium-zinc oxide (IGZO).

An insulating layer IN1 may be positioned on the semiconductor layer AL. The insulating layer IN1 may include an inorganic insulating material, for example, such as a silicon nitride, a silicon oxide, or a silicon oxynitride, and may have a single layer structure or a multilayered structure.

A first gate conductive layer including a gate electrode GE of the transistor TR, a gate line GL, and a first electrode C1 of a capacitor CS may be positioned on the insulating layer IN1. The first gate conductive layer may include molybdenum (Mo), aluminum (Al), copper (Cu), and/or titanium (Ti), and may have a single layer structure or a multilayered structure.

An insulating layer IN2 may be positioned on the first gate conductive layer. The insulating layer IN2 may include an inorganic insulating material, for example, such as a silicon nitride, a silicon oxide, and/or a silicon oxynitride, and may have a single layer structure or a multilayered structure.

A second gate conductive layer including a second electrode C2 of the capacitor CS may be positioned on the insulating layer IN2. The second gate conductive layer may include molybdenum (Mo), aluminum (Al), copper (Cu), and/or titanium (Ti), and may have a single layer structure or a multilayered structure.

An insulating layer IN3 may be positioned on the insulating layer IN2 and the second gate conductive layer. The insulating layer IN3 may include an inorganic insulating material, for example, such as a silicon nitride, a silicon oxide, or a silicon oxynitride, and may have a single layer structure or a multilayered structure.

A first data conductive layer including a first electrode SE and a second electrode DE of the transistor TR, and a data line DL, may be positioned on the insulating layer IN3. The first electrode SE and the second electrode DE may be connected to the first region and the second region, respectively, of the semiconductor layer AL through contact holes of (e.g., penetrating) the insulating layers IN1, IN2, and IN3. One of the first electrode SE and the second electrode DE may be a source electrode, and the other thereof may be a drain electrode. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), and/or copper (Cu), and may have a single layer structure or a multilayered structure.

An insulating layer IN4 may be positioned on the first data conductive layer. The insulating layer IN4 may be an organic insulating layer. For example, the insulating layer IN4 may include an organic insulating material including a general purpose polymer, for example, such as polymethyl methacrylate or polystyrene, a polymer derivative having a phenol-based group, an acryl-based polymer, an imide-based polymer, a polyimide, and/or a siloxane-based polymer.

A second data conductive layer including a voltage line VL and a connection electrode LE may be positioned on the insulating layer IN4. The voltage line VL may transmit voltages, for example, such as a driving voltage, a common voltage, an initialization voltage, and/or a reference voltage, to the pixel PX. The connection electrode LE may be connected to the second electrode DE of the transistor TR through a contact hole of (e.g., penetrating) the insulating layer IN4. The second data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), or copper (Cu), and may have a single layer structure or a multilayered structure.

An insulating layer IN5 may be positioned on the second data conductive layer. The insulating layer IN5 may be an organic insulating layer. For example, the insulating layer IN5 may include an organic insulating material including a general purpose polymer, for example, such as polymethyl methacrylate or polystyrene, a polymer derivative having a phenol-based group, an acryl-based polymer, an imide-based polymer, a polyimide, and/or a siloxane-based polymer.

The first electrode E1 of the light emitting diode LED may be positioned on the insulating layer IN5. The first electrode E1 may be referred to as a pixel electrode. The first electrode E1 may be connected to the connection electrode LE through a contact hole of (e.g., penetrating) the insulating layer IN5. Therefore, the first electrode E1 may be electrically connected to the second electrode DE of the transistor TR to receive a data signal for controlling a luminance of the light emitting diode LED. The transistor TR to which the first electrode E1 is connected may be a driving transistor, or a transistor that is electrically connected to the driving transistor. The first electrode E1 may include (e.g., may be made of) a reflective conductive material or a semi-transmittable conductive material, or may include (e.g., may be made of) a transparent conductive material. The first electrode E1 may include a transparent conductive material, for example, such as an indium tin oxide (ITO) or an indium zinc oxide (IZO). The first electrode E1 may include a metal, for example, such as lithium (Li), calcium (Ca), aluminum (Al), silver (Ag), magnesium (Mg), gold (Au), or a suitable metal alloy thereof.

An insulating layer IN6 may be positioned on the insulating layer IN5. The insulating layer IN6 may be referred to as a pixel defining layer or a partition wall, and may include an opening overlapping with the first electrode E1. The insulating layer IN6 may include an organic insulating material including a general purpose polymer, for example, such as polymethyl methacrylate or polystyrene, a polymer derivative having a phenol-based group, an acryl-based polymer, an imide-based polymer, a polyimide, and/or a siloxane-based polymer.

An emission layer EL may be positioned on the first electrode E1. At least one of a hole injection layer, a hole transfer layer, an electron transfer layer, and/or an electron injection layer, in addition to the emission layer EL, may be positioned on the first electrode E1.

A second electrode E2 may be positioned on the emission layer EL. The second electrode E2 may be referred to as a common electrode. The second electrode E2 may be allowed to have an optical transmittance by making a thin layer with a metal with a low work function, for example, such as calcium (Ca), barium (Ba), magnesium (Mg), aluminum (Al), silver (Ag), or a suitable metal alloy thereof. The second electrode E2 may include a transparent conductive oxide, for example, such as an indium tin oxide (ITO) or an indium zinc oxide (IZO).

The first electrode E1 of the pixel PX, the emission layer EL, and the second electrode E2 configure (e.g., form or are included in) the light emitting diode LED, for example, such as an organic light emitting diode. The first electrode E1 may be an anode of the light emitting diode LED, and the second electrode E2 may be a cathode of the light emitting diode LED.

An encapsulation layer EN may be positioned on the second electrode E2. The encapsulation layer EN may prevent or substantially prevent moisture and/or oxygen from permeating from the outside by encapsulating the light emitting diode LED. The encapsulation layer EN may be a thin film encapsulation layer including at least one inorganic layer and at least one organic layer.

A buffer layer TBL may be positioned on the encapsulation layer EN. The buffer layer TBL may protect the encapsulation layer EN by covering the encapsulation layer EN, and may prevent or substantially prevent the permeation of moisture. The buffer layer TBL may reduce a parasitic capacitance between the second electrode E2 and the touch electrode TE. The buffer layer TBL may include an inorganic insulating material, for example, such as a silicon nitride, a silicon oxide, or a silicon oxynitride, and may have a single layer structure or a multilayered structure.

A touch sensor layer including a touch electrode TE may be positioned on the buffer layer TBL. The touch electrode TE may have a mesh shape including an opening overlapping with the light emitting diode LED.

An insulating layer IN7 for covering the touch electrode TE may be positioned on the touch sensor layer. The insulating layer IN7 may include an inorganic insulating material, for example, such as a silicon nitride, a silicon oxide, or a silicon oxynitride, or an organic material, for example, such as an acryl-based polymer or a polyimide-based resin.

An antireflection layer AR for reducing reflection of external light may be positioned on the insulating layer IN7. The antireflection layer AR may include a polarization layer. The antireflection layer AR may be attached by an adhesive, or may be positioned on the insulating layer IN7. An antireflection effect may be obtained by forming the encapsulation layer EN, the touch sensor layer, and/or the insulating layer IN7 with a refractive index matching structure, instead of the antireflection layer AR. The reflection of the external light may be reduced by a combination of a light blocking member and a color filter.

A protection film PF for protecting the display panel 20 may be positioned below the substrate SB. The protection film PF may include (e.g., may be made of) various suitable polymers, for example, such as a polyethylene terephthalate, a polyethylene naphthalate, or a polyimide.

A functional sheet FS including at least one of a cushion layer, a heat blocking sheet, a light blocking sheet, a waterproof tape, and/or an electromagnetic blocking film may be positioned below the protection film PF.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:
a display panel; and
a cover window on the display panel,
wherein the display panel and the cover window comprise a flat area, and a bendable area adjacent to the flat area,
wherein the cover window comprises patterns at at least one of the bendable area or the flat area along a first direction,
wherein the patterns comprise a first pattern, a second pattern adjacent to the first pattern, and a third pattern adjacent to the second pattern, and
wherein a first gap between the first and second patterns is different from a second gap between the second and third patterns.

2. The display device of claim 1, wherein:
the first pattern is closer to a border between the flat area and the bendable area than the second pattern is, and
the second gap is greater than the first gap.

3. The display device of claim 1, wherein:
the patterns further comprise a fourth pattern adjacent to the third pattern, and
a third gap between the third pattern and the fourth pattern is different from at least one of the first gap or the second gap.

4. The display device of claim 3, wherein:
the first pattern is closer to a border between the flat area and the bendable area than the second pattern is, and
the second gap is greater than the first gap, and the third gap is greater than the second gap.

5. The display device of claim 1, wherein:
the cover window comprises a base film including grooves,
the grooves comprise a first groove, a second groove, and a third groove, which define the first pattern, the second pattern, and the third pattern, respectively, and
a depth of the first groove is different from at least one of a depth of the second groove or a depth of the third groove.

6. The display device of claim 1, wherein a length of the first pattern is different from at least one of a length of the second pattern or a length of the third pattern.

7. The display device of claim 1, wherein the cover window comprises a base film including grooves, the grooves defining the patterns.

8. The display device of claim 7, wherein the cover window further comprises soft portions in the grooves, the soft portions having a rigidity lower than a rigidity of the base film.

9. A display device comprising:
a display panel; and
a cover window on the display panel,
wherein the display panel and the cover window comprise a flat area, and a bendable area adjacent to the flat area,
wherein the cover window comprises patterns at at least one of the bendable area or the flat area along a first direction,
wherein the patterns comprise a first pattern, and a second pattern adjacent to the first pattern, and
wherein a first length of the first pattern is different from a second length of the second pattern.

10. The display device of claim 9, wherein:
the first pattern is closer to a border between the flat area and the bendable area than the second pattern is, and
the first length is greater than the second length.

11. The display device of claim 9, wherein:
the patterns further comprise a third pattern adjacent to the second pattern, and
a third length of the third pattern is different from at least one of the first length or the second length.

12. The display device of claim 11, wherein:
the first pattern is closer to a border between the flat area and the bendable area than the second pattern is, and
the first length is greater than the second length and the second length is greater than the third length.

13. The display device of claim 11, wherein a gap between the first and second patterns is different from a gap between the second and third patterns.

14. The display device of claim 9, wherein:
the cover window comprises a base film including grooves,
the grooves comprise a first groove and a second groove, which define the first pattern and the second pattern, respectively, and
a depth of the first groove is different from a depth of the second groove.

15. The display device of claim 9, wherein:
the cover window comprises:
a base film including grooves, the grooves defining the patterns; and
soft portions in the grooves, the soft portions having a rigidity lower than a rigidity of the base film.

16. A display device comprising:
a display panel; and
a cover window on the display panel,
wherein the display panel and the cover window comprise a flat area, and a bendable area adjacent to the flat area,
wherein the cover window comprises patterns at at least one of the bendable area or the flat area along a first direction, the patterns comprising a first pattern, and a second pattern adjacent to the first pattern,
wherein the cover window comprises a base film including grooves, the grooves comprising a first groove and a second groove, which define the first pattern and the second pattern, respectively, and
wherein a first depth of the first groove is different from a second depth of the second groove.

17. The display device of claim 16, wherein:
the first pattern is closer to a border between the flat area and the bendable area than the second pattern is, and
the first depth is greater than the second depth.

18. The display device of claim 16, wherein:
the patterns further comprise a third pattern adjacent to the second pattern,
the grooves further comprise a third groove, which defines the third pattern, and
a third depth of the third groove is different from at least one of the first depth or the second depth.

19. The display device of claim 18, wherein:
the first pattern is closer to a border between the flat area and the bendable area than the second pattern, and
the first depth is greater than the second depth, and the second depth is greater than the third depth.

20. The display device of claim 16, wherein the cover window further comprises soft portions in the grooves, the soft portions having a rigidity lower than a rigidity of the base film.

* * * * *